United States Patent
Pinayour Chandrasekaran et al.

(10) Patent No.: US 12,200,754 B2
(45) Date of Patent: Jan. 14, 2025

(54) TECHNIQUES FOR ASSISTED MESSAGE DECODING

(71) Applicant: QUALCOMM Incorporated, San Diego, CA (US)

(72) Inventors: Sarath Pinayour Chandrasekaran, Hyderabad (IN); Satish Kumar, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 456 days.

(21) Appl. No.: 17/508,680

(22) Filed: Oct. 22, 2021

(65) Prior Publication Data

US 2023/0126013 A1    Apr. 27, 2023

(51) Int. Cl.
*H04W 74/00*      (2009.01)
*H04W 74/0833*    (2024.01)
*H04W 76/10*      (2018.01)

(52) U.S. Cl.
CPC ..... *H04W 74/002* (2013.01); *H04W 74/0833* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 9,042,240 B2* | 5/2015 | Luo | ................. | H04L 1/0038 |
| | | | | 370/252 |
| 10,405,355 B2* | 9/2019 | Lin | ................. | H04W 74/085 |
| 2011/0026645 A1* | 2/2011 | Luo | ................. | H04L 1/0038 |
| | | | | 455/226.1 |
| 2016/0219624 A1* | 7/2016 | Lin | ................. | H04W 74/085 |
| 2018/0070369 A1* | 3/2018 | Papasakellariou | .... | H04W 72/20 |
| 2019/0387533 A1* | 12/2019 | Papasakellariou | ................. | H04W 72/1215 |
| 2020/0267774 A1* | 8/2020 | Vos | ................. | H04W 74/0833 |
| 2020/0267803 A1* | 8/2020 | Kwak | ................. | H04L 27/2605 |
| 2021/0051707 A1* | 2/2021 | Rastegardoost | .... | H04W 74/006 |
| 2021/0153259 A1* | 5/2021 | Wu | ................. | H04L 1/1864 |
| 2021/0410191 A1* | 12/2021 | Wu | ................. | H04W 74/0833 |
| 2022/0070941 A1* | 3/2022 | Farag | ................. | H04W 74/0833 |
| 2022/0109540 A1* | 4/2022 | Cozzo | ................. | H04W 74/0833 |
| 2022/0124816 A1* | 4/2022 | Farag | ................. | H04L 5/0044 |
| 2022/0124820 A1* | 4/2022 | Ko | ................. | H04W 56/0045 |

(Continued)

*Primary Examiner* — Faiyazkhan Ghafoerkhan
(74) *Attorney, Agent, or Firm* — Dalei Dong; Holland & Hart LLP

(57) ABSTRACT

Methods, systems, and devices for wireless communications are described. In some systems, a user equipment (UE) may transmit a first random access preamble to a base station and may transmit a payload associated with the first random access preamble via a first random access message as part of a two-step random access procedure. The base station may receive the first random access message and attempt to detect the first random access preamble. The base station may identify multiple random access preamble indices based on a detected random access preamble and may perform multiple decoding attempts on the payload portion of the first random access message using the multiple random access preamble indices. The base station may perform the multiple decoding attempts sequentially until one decoding attempt is successful or may perform the multiple decoding attempts in parallel.

26 Claims, 19 Drawing Sheets

(56) References Cited

U.S. PATENT DOCUMENTS

| | | | |
|---|---|---|---|
| 2022/0141877 A1* | 5/2022 | Ko | H04W 74/0833 |
| | | | 370/329 |
| 2022/0141884 A1* | 5/2022 | Lee | H04W 72/0446 |
| | | | 370/329 |
| 2022/0150982 A1* | 5/2022 | Lee | H04W 74/0866 |
| 2022/0167427 A1* | 5/2022 | Ko | H04L 5/0053 |
| 2022/0191944 A1* | 6/2022 | Reial | H04W 74/002 |
| 2022/0201763 A1* | 6/2022 | Lee | H04W 72/23 |
| 2022/0210806 A1* | 6/2022 | Rastegardoost | H04L 5/0051 |
| 2022/0287107 A1* | 9/2022 | Kim | H04W 72/0446 |
| 2022/0312497 A1* | 9/2022 | Vos | H04L 5/0048 |
| 2022/0322454 A1* | 10/2022 | Choi | H04W 72/0446 |
| 2023/0043620 A1* | 2/2023 | Khoshkholgh Dashtaki | H04W 74/0833 |
| 2023/0045529 A1* | 2/2023 | Khoshkholgh Dashtaki | H04W 74/0841 |
| 2023/0081864 A1* | 3/2023 | Ko | H04W 74/0841 |
| | | | 370/329 |
| 2023/0126013 A1* | 4/2023 | Pinayour Chandrasekaran | H04W 74/0833 |
| | | | 370/329 |
| 2023/0164850 A1* | 5/2023 | Lee | H04L 41/0803 |
| | | | 370/254 |
| 2023/0180299 A1* | 6/2023 | Lin | H04W 74/0833 |
| | | | 370/329 |

\* cited by examiner

| ZcZ | NCS | Number of Preambles per Root Sequence | PRACH Receiver Window per Root Sequence | | | | | | | |
|---|---|---|---|---|---|---|---|---|---|---|
| | | | 56–63 | 48–55 | 40–47 | 32–39 | 24–31 | 16–23 | 8–15 | 0–7 |
| | | | 7 | 6 | 5 | 4 | 3 | 2 | 1 | 0 |
| 1 | 2 | 64 | | | | | | | | |
| 9 | 17 | 8 | Preamble #3 | Preamble #2 | | | Preamble #1 | | | Preamble #0 |
| 13 | 34 | 4 | | | | Preamble #1 | | | Preamble #0 | |
| 15 | 69 | 2 | | | | | Preamble #0 | | | |
| 0 | 0 | 1 | | | | Preamble #0 | | | | |

TECHNIQUES FOR ASSISTED MESSAGE DECODING

FIELD OF DISCLOSURE

The following relates to wireless communications, including techniques for assisted message decoding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE may attempt to establish a connection with a base station via a random access procedure. Such a random access procedure may include a two-step random access procedure or a four-step random access procedure.

SUMMARY

The present disclosure relates to improved methods, systems, devices, and apparatuses that support techniques for assisted message decoding. In some implementations, the present disclosure provides for multiple decoding attempts, at a base station, on a payload portion of a first random access message using multiple different preamble indices. For example, a UE may transmit the first random access message, which may be an example of a message A (msgA), including a first random access preamble and a payload. The base station may receive the first random access message and, in some scenarios, may have a relatively high likelihood for detecting a different random access preamble than the first random access preamble transmitted by the UE. For example, although the UE transmits the first random access preamble, the base station may detect a second random access preamble. In some implementations, the base station may attempt to decode the payload using the detected second random access preamble and may additionally attempt to decode the payload using one or more random access preambles that are adjacent to the second random access preamble. In some aspects, such one or more adjacent random access preambles may include or refer to random access preambles having adjacent or nearby cyclic shifts or time shifts relative to a cyclic shift or time shift of the detected second random access preamble.

A method for wireless communication at a first device is described. The method may include receiving, from a second device, a first random access message including a first random access preamble on a random access channel and a payload on an uplink shared channel, performing a first decoding attempt for the payload using a second random access preamble index, the first decoding attempt being performed in response to receiving the first random access message, performing a second decoding attempt for the payload using a first random access preamble index associated with the first random access preamble, and transmitting, to the second device, a random access response message that includes an indication of the first random access preamble index, the transmitting of the random access response message based on successfully performing the second decoding attempt.

An apparatus for wireless communication at a first device is described. The apparatus may include a processor, memory coupled with the processor, and instructions stored in the memory. The instructions may be executable by the processor to cause the apparatus to receive, from a second device, a first random access message including a first random access preamble on a random access channel and a payload on an uplink shared channel, perform a first decoding attempt for the payload using a second random access preamble index, the first decoding attempt being performed in response to receiving the first random access message, perform a second decoding attempt for the payload using a first random access preamble index associated with the first random access preamble, and transmit, to the second device, a random access response message that includes an indication of the first random access preamble index, the transmitting of the random access response message based on successfully performing the second decoding attempt.

Another apparatus for wireless communication at a first device is described. The apparatus may include means for receiving, from a second device, a first random access message including a first random access preamble on a random access channel and a payload on an uplink shared channel, means for performing a first decoding attempt for the payload using a second random access preamble index, the first decoding attempt being performed in response to receiving the first random access message, means for performing a second decoding attempt for the payload using a first random access preamble index associated with the first random access preamble, and means for transmitting, to the second device, a random access response message that includes an indication of the first random access preamble index, the transmitting of the random access response message based on successfully performing the second decoding attempt.

A non-transitory computer-readable medium storing code for wireless communication at a first device is described. The code may include instructions executable by a processor to receive, from a second device, a first random access message including a first random access preamble on a random access channel and a payload on an uplink shared channel, perform a first decoding attempt for the payload using a second random access preamble index, the first decoding attempt being performed in response to receiving the first random access message, perform a second decoding attempt for the payload using a first random access preamble index associated with the first random access preamble, and transmit, to the second device, a random access response message that includes an indication of the first random access preamble index, the transmitting of the random access response message based on successfully performing the second decoding attempt.

Some examples of the method, apparatuses, and non-transitory computer-readable medium described herein may further include operations, features, means, or instructions for detecting a second random access preamble based on a reception time associated with the first random access message, where performing the first decoding attempt for the payload using the second random access preamble index may be based on detecting the second random access preamble.

Some examples of the method, apparatuses, and non-transitory computer-readable medium described herein may further include operations, features, means, or instructions for receiving, at a Layer 1 (L1) entity of the first device from a Layer 2 (L2) entity of the first device, a set of multiple random access preamble indices including the first random access preamble index and the second random access preamble index, where performing the first decoding attempt and the second decoding attempt may be based on receiving the set of multiple random access preamble indices.

In some examples of the method, apparatuses, and non-transitory computer-readable medium described herein, the set of multiple random access preamble indices include the second random access preamble index and one or more adjacent random access preamble indices from a set of available random access preamble indices that may be associated with a same root sequence index as the second random access preamble index.

In some examples of the method, apparatuses, and non-transitory computer-readable medium described herein, the one or more adjacent random access preamble indices that may be associated with the same root sequence may be identified from the set of available random access preamble indices based on one or more of a zero correlation zone configuration, a length of a random access sequence, a random access channel format, and a random access channel sub-carrier spacing.

In some examples of the method, apparatuses, and non-transitory computer-readable medium described herein, the set of multiple random access preamble indices include the second random access preamble index and one or more adjacent random access preamble indices from a set of available random access preamble indices that may be associated with different root sequence indices.

Some examples of the method, apparatuses, and non-transitory computer-readable medium described herein may further include operations, features, means, or instructions for transmitting, from the L1 entity to the L2 entity, an indication of the second random access preamble index based on detecting a second random access preamble, where receiving the set of multiple random access preamble indices may be based on transmitting the indication of the second random access preamble index.

Some examples of the method, apparatuses, and non-transitory computer-readable medium described herein may further include operations, features, means, or instructions for selecting, at an L1 entity of the first device without signaling from an L2 entity of the first device, a set of multiple random access preamble indices including the first random access preamble index and the second random access preamble index, where performing the first decoding attempt and the second decoding attempt may be based on selecting the set of multiple random access preamble indices.

Some examples of the method, apparatuses, and non-transitory computer-readable medium described herein may further include operations, features, means, or instructions for transmitting, from an L1 entity of the first device to an L2 entity of the first device, a payload decoding report indicating that the second decoding attempt for the payload using the first random access preamble index may be successful and storing, at the L2 entity of the first device, the first random access preamble based on the payload decoding report indicating that the second decoding attempt for the payload using the first random access preamble index may be successful.

Some examples of the method, apparatuses, and non-transitory computer-readable medium described herein may further include operations, features, means, or instructions for determining a timing advance for the user equipment (UE) based on the first random access preamble index and the second random access preamble index, where the random access response message further includes an indication of the timing advance.

In some examples of the method, apparatuses, and non-transitory computer-readable medium described herein, the timing advance may be based on a time offset between a first reception time associated with the first random access preamble and a second random access preamble associated with the second random access preamble index.

In some examples of the method, apparatuses, and non-transitory computer-readable medium described herein, performing the second decoding attempt may include operations, features, means, or instructions for performing the second decoding attempt subsequent to the first decoding attempt based on a result of the first decoding attempt being unsuccessful.

In some examples of the method, apparatuses, and non-transitory computer-readable medium described herein, performing the first decoding attempt and the second decoding attempt may include operations, features, means, or instructions for performing the first decoding attempt for the payload using the second random access preamble index and the second decoding attempt for the payload using the first random access preamble index in parallel.

Some examples of the method, apparatuses, and non-transitory computer-readable medium described herein may further include operations, features, means, or instructions for performing the first decoding attempt for the payload using the second random access preamble index includes using a second scrambling sequence generation based on the second random access preamble index and performing the second decoding attempt for the payload using the first random access preamble index includes using a first scrambling sequence generation based on the first random access preamble index.

In some examples of the method, apparatuses, and non-transitory computer-readable medium described herein, the first random access message includes a message A (msgA) of a two-step random access procedure and the random access response message includes a message B (msgB) of the two-step random access procedure.

A method for wireless communication at a second device is described. The method may include transmitting, to a first device, a first random access message including a first random access preamble on a random access channel and a payload on an uplink shared channel, receiving, from the first device, a random access response message that includes an indication of the first random access preamble and a timing advance, determining whether the timing advance satisfies a threshold, and establishing a connection with the first device based on whether the timing advance satisfies the threshold.

An apparatus for wireless communication at a second device is described. The apparatus may include a processor, memory coupled with the processor, and instructions stored in the memory. The instructions may be executable by the processor to cause the apparatus to transmit, to a first device, a first random access message including a first random access preamble on a random access channel and a payload on an uplink shared channel, receive, from the first device, a random access response message that includes an indication of the first random access preamble and a timing advance, determine whether the timing advance satisfies a threshold, and establish a connection with the first device based on whether the timing advance satisfies the threshold.

Another apparatus for wireless communication at a second device is described. The apparatus may include means for transmitting, to a first device, a first random access message including a first random access preamble on a random access channel and a payload on an uplink shared channel, means for receiving, from the first device, a random access response message that includes an indication of the first random access preamble and a timing advance, means for determining whether the timing advance satisfies a threshold, and means for establishing a connection with the first device based on whether the timing advance satisfies the threshold.

A non-transitory computer-readable medium storing code for wireless communication at a second device is described. The code may include instructions executable by a processor to transmit, to a first device, a first random access message including a first random access preamble on a random access channel and a payload on an uplink shared channel, receive, from the first device, a random access response message that includes an indication of the first random access preamble and a timing advance, determine whether the timing advance satisfies a threshold, and establish a connection with the first device based on whether the timing advance satisfies the threshold.

In some examples of the method, apparatuses, and non-transitory computer-readable medium described herein, determining whether the timing advance satisfies the threshold may further include operations, features, means, or instructions for determining that the timing advance satisfies the threshold. In such examples of the method, apparatuses, and non-transitory computer-readable medium described herein, establishing the connection with the first device may further include operations, features, means, or instructions for establishing the connection based on the random access response message.

In some examples of the method, apparatuses, and non-transitory computer-readable medium described herein, determining whether the timing advance satisfies the threshold may further include operations, features, means, or instructions for determining that the timing advance fails to satisfy the threshold. In such examples of the method, apparatuses, and non-transitory computer-readable medium described herein, establishing the connection with the first device may include operations, features, means, or instructions for establishing the connection based on different random access signaling.

In some examples of the method, apparatuses, and non-transitory computer-readable medium described herein, the first random access message includes a msgA of a two-step random access procedure and the random access response message includes a msgB of the two-step random access procedure.

DETAILED DESCRIPTION

Figure 1:
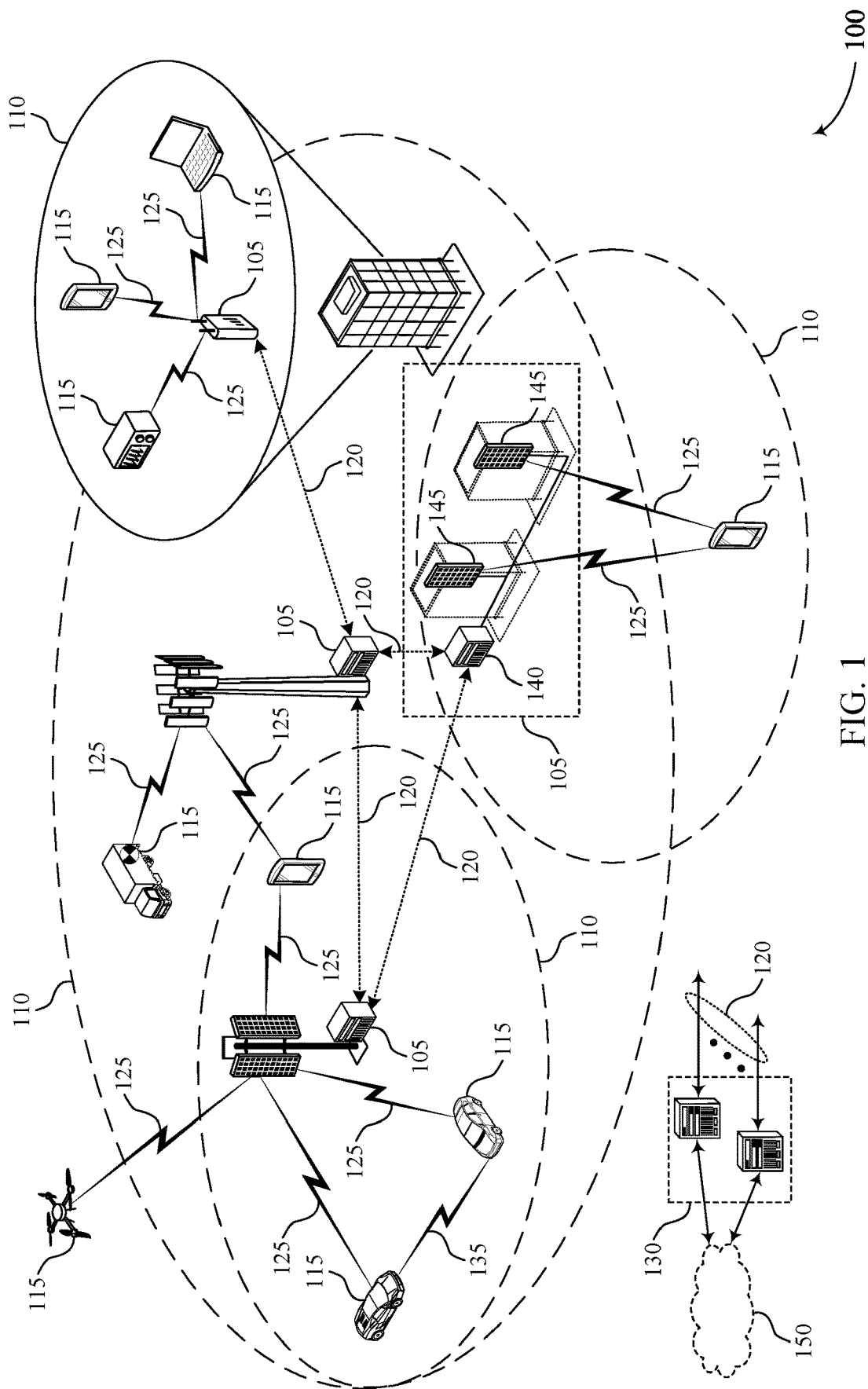
FIGS. 1 and 2 illustrate examples of wireless communications systems that support techniques for assisted message decoding in accordance with various aspects of the present disclosure.

In some wireless communications systems, a user equipment (UE) may attempt to establish a connection with a base station via a random access procedure. The random access procedure may be a two-step random access procedure or a four-step random access procedure. In examples in which the random access procedure is a two-step random access procedure, the UE may transmit a first random access message, which may be an example of a message A (msgA), including a first random access preamble on a physical random access channel (PRACH) and a payload on a physical uplink shared channel (PUSCH). The base station may receive the first random access message and may attempt to decode the payload on the PUSCH using a detected random access preamble. In some cases, the base station may detect a different random access preamble than the one transmitted by the UE due to timing alignment error. In such cases, the base station may be unable to successfully decode the payload on the PUSCH and the random access procedure may fail, resulting in the UE performing another random access procedure.

In some implementations of the present disclosure, the base station may attempt to decode the payload on the PUSCH using the detected random access preamble and one or more other random access preambles to increase a likelihood that the base station is able to successfully decode the payload. For example, the base station may detect a second random access preamble (even though the UE transmits the first random access preamble) due to a timing alignment error and, to increase the likelihood that the base station is able to successfully decode the payload, may select one or more other random access preambles for additional decoding attempts for the payload. In some examples, the base station may autonomously select the one or more other random access preambles at a Layer 1 (L1) entity of the base station. The one or more other random access preambles may be a configurable number from a Layer 2 (L2) entity of the base station during initial setup.

In some other examples, the L1 entity of the base station may receive an indication of or request for the one or more other random access preambles from the L2 entity of the base station. In some implementations, the L1 entity of the base station may receive the request for the one or more other random access preambles from the L2 entity of the base station based on transmitting an indication of the detected random access preamble to the L2 entity. In such implementations, for example, the L2 entity may provide the L1 entity with the one or more other random access preambles based on receiving the indication of which random access preamble the L1 entity detects. As such, the base station may attempt to decode the received payload using the detected random access preamble and one or more other random access preambles that may be adjacent to the detected random access preamble.

Some aspects of the subject matter described herein may be implemented to realize one or more of the following potential advantages. For example, as a result of achieving a greater likelihood for successfully decoding the payload on the PUSCH based on performing multiple decoding attempts for the payload using different random access preambles, the UE and the base station may experience a lower likelihood for random access procedure failures. As such, the UE and the base station may experience lower latency and greater reliability for connection establishment. Further, the UE and the base station may exchange less random access signaling, which may provide greater spectral efficiency, lower system congestion, and lower signaling overhead. Likewise, and as a result of such greater spectral efficiency, lower system congestion, and lower signaling overhead, the UE and the base station may experience greater data rates and greater system capacity.

Aspects of the disclosure are initially described in the context of wireless communications systems. Aspects of the disclosure are additionally illustrated by and described with reference to a random access table and process flows. Aspects of the disclosure are further illustrated by and described with reference to apparatus diagrams, system diagrams, and flowcharts that relate to techniques for assisted message decoding.

FIG. 1 illustrates an example of a wireless communications system 100 that supports techniques for assisted message decoding in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or expected functions.

Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a specific orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some systems, such as the wireless communications system 100, a UE 115 may attempt to establish a connection (e.g., a wireless connection) with a base station 105. The UE 115 may perform a random access procedure to establish the connection with the base station 105. As part of the random access procedure, the UE 115 and the base station 105 may exchange one or more random access messages associated with the establishment of the connection between the UE 115 and the base station 105. The UE 115 and the base station 105 may participate in a two-step random access procedure or a four-step random access procedure.

As part of a two-step random access procedure, the UE 115 may transmit a first random access message, which may include or otherwise be referred to as a msgA, including a first random access preamble on a PRACH and a payload on a PUSCH. The base station 105 may receive the first random access preamble, detect the transmitted random access preamble, and use the detected random access preamble to decode the payload portion of the first random access message on the PUSCH. In some cases, however, the base station 105 may detect a different random access preamble than the first random access preamble transmitted by the UE 115. For example, the base station 105 may detect a second random access preamble instead of the first random access preamble (e.g., due to a timing alignment error).

In some implementations, to reduce the likelihood of a decoding failure for the payload on the PUSCH, the base station 105 may perform multiple decoding attempts on the payload using multiple random access preambles. For example, the base station 105 may perform a first decoding attempt using a second random access preamble index associated with the second random access preamble (e.g., the random access preamble that the base station 105 detects) and may perform one or more additional decoding attempts using random access preamble indices adjacent to the second random access preamble index. In some aspects, such one or more adjacent random access preamble indices may include indices associated with random access preambles having relatively proximate cyclic shifts or time shifts within a receiver window to the second random access preamble detected by the base station 105.

Figure 2:
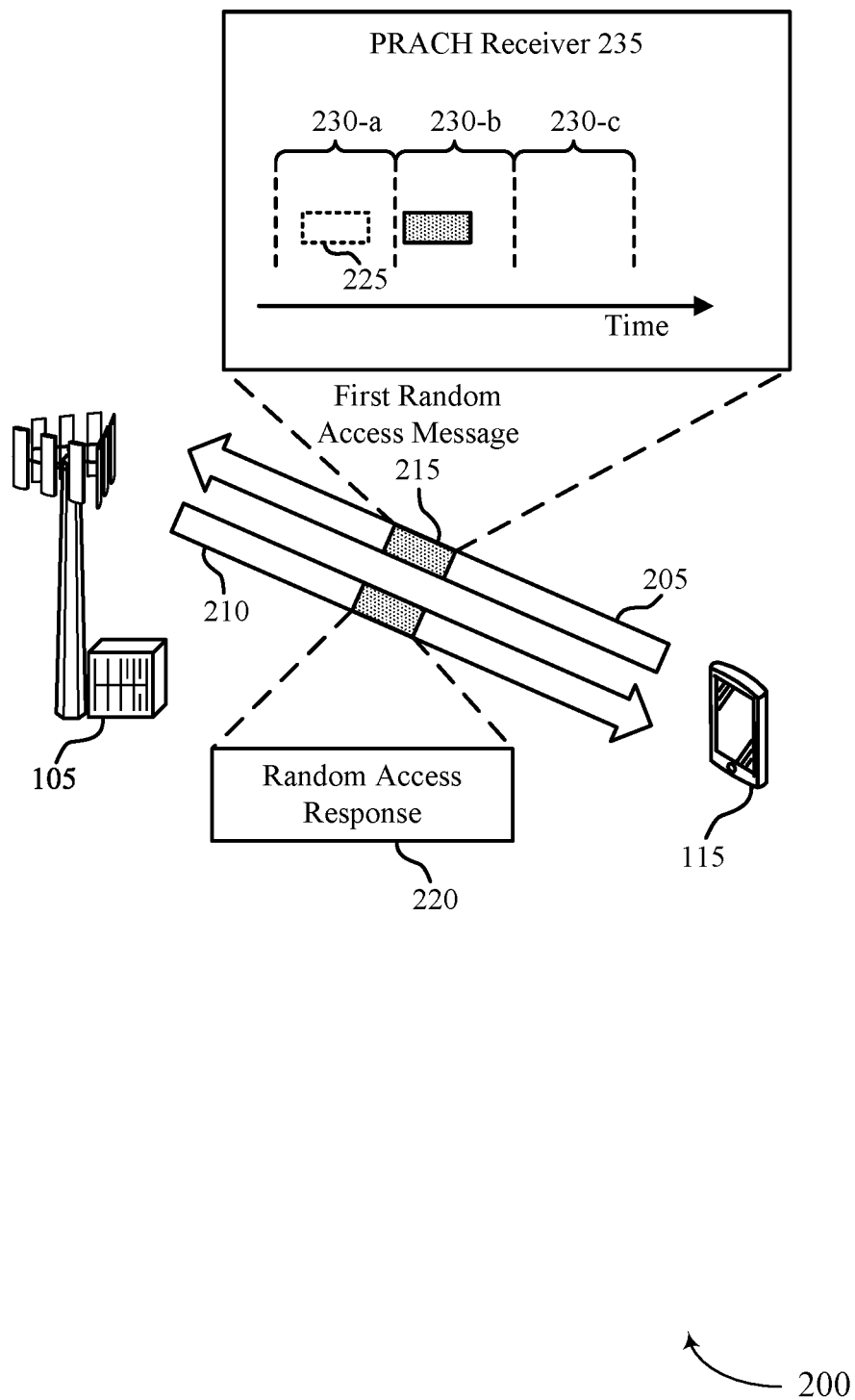

FIG. 2 illustrates an example of a wireless communications system 200 that supports techniques for assisted message decoding in accordance with various aspects of the present disclosure. The wireless communications system 200 may implement or be implemented to realize aspects of the wireless communications system 100. For example, the wireless communications system 200 illustrates communication between a UE 115 and a base station 105, which may be examples of corresponding devices described herein, including with reference to FIG. 1. In some examples, the base station 105 may receive a first random access message 215, which may be an example of a msgA, from the UE 115 and may attempt to decode a payload portion of the first random access message 215 using multiple random access preamble indices.

For example, the UE 115 may attempt to establish a connection with the base station 105 and may initiate a random access procedure with the base station 105 based on transmitting the first random access message 215 to the base station 105 via a communication link 205. In some aspects, the random access procedure may be an example of a two-step random access procedure and the UE 115 may include a first random access preamble on a PRACH and a payload on a PUSCH in the first random access message 215. The UE 115 may monitor for a random access response 220 from the base station 105 via a communication link 210.

In some systems, such as 5G NR systems, the UE 115 and the base station 105 may generate PRACH preamble sequences as Zadoff-Chu (ZC) sequences using a given root sequence. In some aspects, a quantity of different preamble sequences that the UE 115 and the base station 105 may generate for a given root sequence may be based on a configured parameter. For example, the base station 105 may configure a value for an $N_{CS}$ parameter to indicate how many cyclic shifts can be derived from a given root, and a quantity of cyclic shifts that can be derived from a given root may correspond to or otherwise correlate with the quantity of different preamble sequences that the UE 115 and the base station 105 can generate for that root. The base station 105 may transmit an indication of the $N_{CS}$ parameter to the UE 115 via control signaling, such as via RRC signaling. For example, the base station 105 may transmit the $N_{CS}$ parameter via a zeroCorrelationZoneConfig parameter.

In some aspects, the more preambles that may be generated (e.g., the lesser the configured value of the $N_{CS}$ parameter) for a given root, the lower the width capability of the system to accommodate (relatively higher) timing alignment error. The UE 115 and the base station 105 may experience timing alignment error (e.g., time error) because of, as a result of, or otherwise based on a round-trip-delay associated with a propagation delay, a frequency or time error, or both, at the base station 105 (e.g., a positive frequency error may cause a negative time shift and vice versa), a negative or positive window size of a PRACH receiver 235 at the base station 105, or any combination thereof. Further, for decreasing values of $N_{CS}$, the number of preambles per root increases and time limits between preambles becomes more stringent (e.g., smaller or narrower). In other words, a duration associated with each receiver window 230 becomes smaller with increasing number of preambles per root.

The base station 105 may detect a preamble index and a timing offset associated with the first random access message 215 based on a location of a peak, which may correspond to a specific cyclic shift, detected by the base station 105 at the PRACH receiver 235 of the base station 105 within a preamble window 230. As such, for relatively small values of $N_{CS}$, even a relatively small timing alignment error in the transmission or reception of the first random access message 215 (e.g., the first random access preamble of the first random access message 215) may shift a detected peak from an intended preamble window 230 to a different preamble window 230 (e.g., an adjacent preamble window 230).

For example, for some $N_{CS}$ values, such as $N_{CS}=2$, a relatively small time error in the transmission or the reception (e.g., such as on the order of approximately 65 nanoseconds) may shift a peak of the first random access preamble to an adjacent preamble window 230, resulting in the base station 105 (e.g., a receiver) reporting a different preamble than the one transmitted by the UE 115. For example, the UE 115 may have intended for the peak (e.g., the cyclic shift) associated with the first random access preamble to be located in a preamble window 230-$a$ at 225, but, due to some timing alignment error, the base station 105 may detect the peak (e.g., the cyclic shift) in a preamble window 230-$b$. As such, for example, the base station 105 may detect or assume that the UE 115 transmitted a second random access preamble associated with a peak (e.g., a cyclic shift) being located in the preamble window 230-$b$.

In some cases, such a reporting of a mis-detected random access preamble may result in a random access failure. For example, in a four-step random access procedure (e.g., a 5G NR four-step random access procedure), the UE 115 may declare a failure due to a message 2 (msg2) random access preamble identifier (RAPID) mismatch. In a two-step random access procedure (e.g., a 5G NR two-step random access procedure, the base station 105 may be unable to successfully decode msgA PUSCH (e.g., the payload portion of the first random access message 215). In some scenarios, the base station 105 may be unable to determine or identify if the preamble that the base station 105 detects is different than the preamble transmitted by the UE 115, while, in some other scenarios, the base station 105 may be able to determine or identify if the preamble that the base station 105 detects is different than the preamble transmitted by the UE 115.

For example, in scenarios in which the UE 115 and the base station 105 perform a four-step random access procedure (e.g., either a 4G LTE or 5G NR four-step random access procedure), the base station 105 may be unable to determine if the preamble that the base station 105 detects is correct because the preamble identifier (ID) detected (e.g., in a message 1 (msg1) of the four-step random access procedure) is not associated with the decoding aspect of the msg2, a message 3 (msg3), or a message 4 (msg4) of the four-step random access procedure. As such, the preamble ID that the base station 105 includes in the msg2 that the base station 105 transmits to the UE 115 is based on the value detected by the base station 105 and may be different than the preamble transmitted by the UE 115 (e.g., because of a round-trip-time or one or both of a frequency or time error in the system). In scenarios in which the UE 115 and the base station 105 perform a two-step random access procedure (e.g., a 5G NR two-step random access procedure), however, the base station 105 may be able to determine if the preamble that the base station 105 detects is correct because the preamble ID detected by the base station 105 is directly applied in data scrambling of the msgA-PUSCH (e.g., the payload portion of the first random access message 215). Thus, if the base station 105 is unable to successfully decode the msgA-PUSCH using a detected preamble ID from the same msgA, the base station 105 may determine or otherwise assume that the base station 105 detected an incorrect preamble.

For example, as part of PUSCH scrambling, the UE 115 may use a scrambling ID for the msgA-PUSCH that is based on a formula that takes the preamble ID as one of the inputs. For example, the UE 115 may initialize a scrambling sequence generator with a $C_{init}$ value, and the UE 115 may calculate, obtain, or otherwise determine the $C_{init}$ value in accordance with Equation 1.

$$C_{init} = \begin{cases} n_{RNTI} \cdot 2^{16} + n_{RAPID} \cdot 2^{10} + n_{ID} & \text{for } msgA \text{ on } PUSCH \\ n_{RNTI} \cdot 2^{15} + n_{ID} & \text{otherwise} \end{cases} \quad (1)$$

As shown in Equation 1, $n_{RAPID}$ may correspond to or otherwise be an index or ID of a random access preamble that the UE 115 transmits via a msgA (e.g., the first random access message 215). As such, the UE 115 may use a scrambling sequence generation or otherwise generate a scrambling sequence for the payload portion of the first random access message 215 based on the first random access preamble included also included in the first random access message 215. Likewise, the base station 105 may use a same or similar procedure for decoding (e.g., de-scrambling) the payload of the first random access message 215. For example, the base station 105 may similarly use Equation 1 to identify which scrambling sequence or scrambling sequence generation the UE 115 used based on inputting the detected random access preamble into Equation 1. As such, if the base station 105 detects a different random access preamble than the first random access preamble that the UE 115 transmits, the base station 105 may obtain a different or incompatible (de-)scrambling sequence for the payload and, accordingly, the base station 105 may fail to decode the payload.

In some implementations, and to increase the likelihood of the base station 105 to successfully decode the payload even in examples in which the base station 105 mis-detects the random access preamble of the first random access message 215, the base station 105 may perform multiple decoding attempts on the payload (e.g., the msgA-PUSCH) using multiple preamble indices. The base station 105 may perform the multiple decoding sequentially, in parallel, or any combination thereof (e.g., via multiple sequential iterations of parallel decoding). In some examples, such as in examples in which the base station 105 performs the multiple decoding attempts sequentially, the base station 105 may attempt more than one decoding attempt if an initial decoding attempt (e.g., using a detected random access preamble index) fails.

In some aspects, the multiple preamble indices that the base station 105 uses may include preamble indices that are adjacent to the preamble index detected by the base station 105. For example, in accordance with some timing alignment error being the reason for the mis-detection of the random access preamble, the base station 105 may perform decoding attempts using preamble indices that are adjacent to the preamble index detected by the base station 105 because the actual preamble index transmitted by the UE 115 may likely be one of such adjacent preamble indices. Such adjacent preamble indices may refer to preamble indices associated with cyclic shifts, time shifts, preamble windows 230, or any other time-domain information associated with reception of the random access preamble at the PRACH receiver 235 that are similar or proximate to a cyclic shift, a time shift, a preamble window 230, or other time-domain information of the detected random access preamble.

For example, the base station 105 may receive or otherwise detect the random access preamble transmitted by the UE 115 during the preamble window 230-*b* and, in examples in which the UE 115 actually intended the random access preamble to be received by the base station during the preamble window 230-*a* at 225, the base station 105 may use an incorrect random access preamble index in a decoding attempt on the payload of the first random access message 215. In some implementations, to avoid a failure of the random access procedure, the base station 105 may perform the multiple decoding attempts for the payload of the first random access message 215 using random access preambles that are associated with preamble windows 230 that are adjacent to the preamble window 230-*b*. For example, the base station 105 may perform a first decoding attempt using a second random access preamble index associated with the preamble window 230-*b* based on (mis-)detecting a second random access preamble, may perform a second decoding attempt using the first random access preamble index associated with the preamble window 230-*a*, and may optionally perform a third decoding attempt using a third random access preamble index associated with a preamble window 230-*c*.

As such, the base station 105 may fail the first decoding attempt and the third decoding attempt, but may pass the second decoding attempt and determine that the UE 115 actually transmitted the first random access preamble associated with the preamble window 230-*a*. In some implementations, the base station 105 may compute a timing advance for the UE 115 using the correct preamble index with which the base station 105 is able to successfully decode the payload and the initially detected preamble and may return the correct preamble index and the computed timing advance to the UE 115 via the random access response 220. The random access response 220 may be an example of a message B (msgB) and the base station 105 may transmit the random access response 220 over a physical downlink shared channel (PDSCH). As such, the random access response 220 may be equivalently referred to as a msgB-PUSCH.

In accordance with implementing aspects of the present disclosure, the UE 115 and the base station 105 may support identification and correction of a preamble index, which may avoid RAPID mismatch between the UE 115 and the base station 105 and avoid a resulting random access procedure (e.g., attach) failures. Further, as a result of the greater likelihood for successful decoding of the payload (e.g., the msgA-PUSCH) using one or more de-scrambling and decoding attempts, the UE 115 may perform fewer re-transmissions of the first random access message 215, which would otherwise add latency and increase power consumption at the UE 115. As such, as a result of implementing aspects of the present disclosure, the UE 115 may achieve lower latency and reduced power consumption, which may be beneficial for various use cases, including URLLC applications which are delay sensitive and for MTC or massive MTC (mMTC) devices which may be designed for low power consumption use.

Additionally, for URLLC cases for which a two-step random access procedure is designed, the UE 115 and the base station 105 may experience improved detection in a first attempt (e.g., a first attempt at transmission of the first random access message 215), which may aid in maintaining or enhancing URLLC quality of service (QoS). Further, the base station 105 may achieve some implementations of the present disclosure via software functionality, which may avoid additional manufacturing costs or complex design changes. Further, the base station 105 may not only increase the likelihood for successful decoding of the payload (e.g., the msgA-PUSCH), but may also correct a detected preamble ID and compute a correct corresponding timing offset (e.g., the timing offset included in msg2 or msgB), which may facilitate more reliable communication between the UE 115 and the base station 105.

Figure 3:
FIG. 3 illustrates an example of a random access table that supports techniques for assisted message decoding in accordance with various aspects of the present disclosure.

FIG. 3 illustrates an example of a random access table 300 that supports techniques for assisted message decoding in accordance with various aspects of the present disclosure. The random access table 300 may be implemented to realize aspects of the wireless communications system 100 or the wireless communications system 200. For example, the random access table 300 illustrates how many PRACH receiver windows a base station 105 may monitor for a transmission of a random access preamble from a UE 115 as part of a random access procedure, and further illustrates how a lower width capability or availability may arise for increasing numbers of preambles per root sequence.

For example, the random access table 300 may include a column 305 illustrating example zeroCorrelationZoneConfig parameters (which may be referred to or illustrated as ZcZ parameters), a column 310 illustrating example $N_{CS}$ values (which may be referred to or illustrated as NCS values), a column 315 illustrating example numbers of preambles per root sequence, and a column 315 illustrating example PRACH receiver windows per root sequence. In other words, the random access table 300 may illustrate mappings between zeroCorrelationZoneConfig parameters, $N_{CS}$ values, numbers of preambles per root sequence, and PRACH receiver windows per root sequence. In some aspects, the random access table 300 may illustrate an example associated with a 5G NR base station 105 supporting a mmW small cell, communication associated with a 120 kHz sub-carrier spacing (SCS), and a length of random access preamble sequence L_RA of 139 (which may be associated with a short format).

As an example, for a zeroCorrelationZoneConfig parameter value of 0, $N_{CS}$=0, there may be one preamble per root sequence, and the base station 105 may likewise support a single PRACH receiver window (for detecting preamble #0). As another example, for a zeroCorrelationZoneConfig parameter value of 15, $N_{CS}$=69, there may be two preambles per root sequence, and the base station 105 may likewise support two PRACH receiver windows (for detecting a preamble #0 and a preamble #1). As another example, for a zeroCorrelationZoneConfig parameter value of 13, $N_{CS}$=34, there may be four preambles per root sequence, and the base station 105 may likewise support four PRACH receiver windows (for detecting a preamble #0, a preamble #1, a preamble #2, and a preamble #3). The random access table 300 further illustrates other examples in which the zeroCorrelationZoneConfig parameter has a value of 9 and 1 and, as $N_{CS}$ becomes smaller, the number of preambles per root sequence, and likewise the number of PRACH receiver windows supported by the base station 105, becomes larger.

As such, in scenarios in which there are a relatively large amount of preambles per root sequence, relatively small timing alignment errors between the UE 115 and the base station 105 may result in a mis-detection, at the base station 105, of which random access preamble is transmitted by the UE 115. Accordingly, in some implementations of the present disclosure, the base station 105 may perform multiple decoding attempts for an associated payload using various, potentially adjacent preamble indices to the preamble index detected by the base station 105. As such, the base station 105 may still successfully decode the associated payload even if a timing alignment error resulted in the base station 105 detecting a random access preamble ID that is several (e.g., one or two) shifts away from the random access preamble ID that the UE 115 actually transmitted, regardless if the timing alignment error is associated with a negative time shift (pushing random access preambles toward higher preamble #) or a positive time shift (pushing random access preambles toward lower preamble #).

In some aspects, the adjacent preamble indices that the base station 105 may use for the decoding attempts on the associated payload may be associated with a same root sequence as the preamble index that the base station 105 detects. For example, for an $N_{CS}$ value of 2 and 64 preamble sequences per root sequence, if the base station 105 detects preamble #6, the base station 105 may limit or constrain its selection of other preamble indices to try for decoding such that the other preamble indices are associated with the same root sequence. In such an example, for instance, the base station 105 may perform decoding attempts on the associated payload using any one or more of preambles #0-5 and 7. Similarly, if the base station 105 detects a preamble #9, the base station 105 may perform decoding attempts on the associated payload using any one or more of preambles #8 and 10-15. In some examples, the one or more adjacent random access preamble indices (e.g., that are associated with a same root sequence) may be identified from a set of available random access preamble indices based on one or more of zeroCorrelationZoneConfig parameter, a length of a random access sequence L_RA, a random access channel format, and a random access channel SCS.

In some other aspects, the adjacent preamble indices that the base station 105 may use for the decoding attempts on the associated payload may be associated with different root sequences. For example, for an $N_{CS}$ value of 2 and 64 preamble sequences per root sequence, if the base station 105 detects preamble #6, the base station 105 may select other preamble indices to try for decoding such that the other preamble indices may include any one or more of preambles #0-5 and 7-15, or any other preamble # associated with an $N_{CS}$ value of 2. Similarly, if the base station 105 detects a preamble #9, the base station 105 may perform decoding attempts on the associated payload using any one or more of preambles #0-8 and 10-15, or any other preamble # associated with an $N_{CS}$ value of 2.

The base station 105 may perform multiple decoding attempts for a received payload for all $N_{CS}$ values or for a subset of $N_{CS}$ values. In some implementations, for example, the base station 105 may activate a setting for multiple decoding attempts for $N_{CS}$ values associated with a number of preambles per given root sequence that satisfies a threshold and may deactivate the setting for multiple decoding attempts for $N_{CS}$ values associated with a number of preambles per given root sequence that fails to satisfy the threshold. Alternatively, in some other implementations, the base station 105 may perform multiple decoding attempts for the received payload commonly or universally (e.g., regardless of $N_{CS}$ value).

Figure 4:
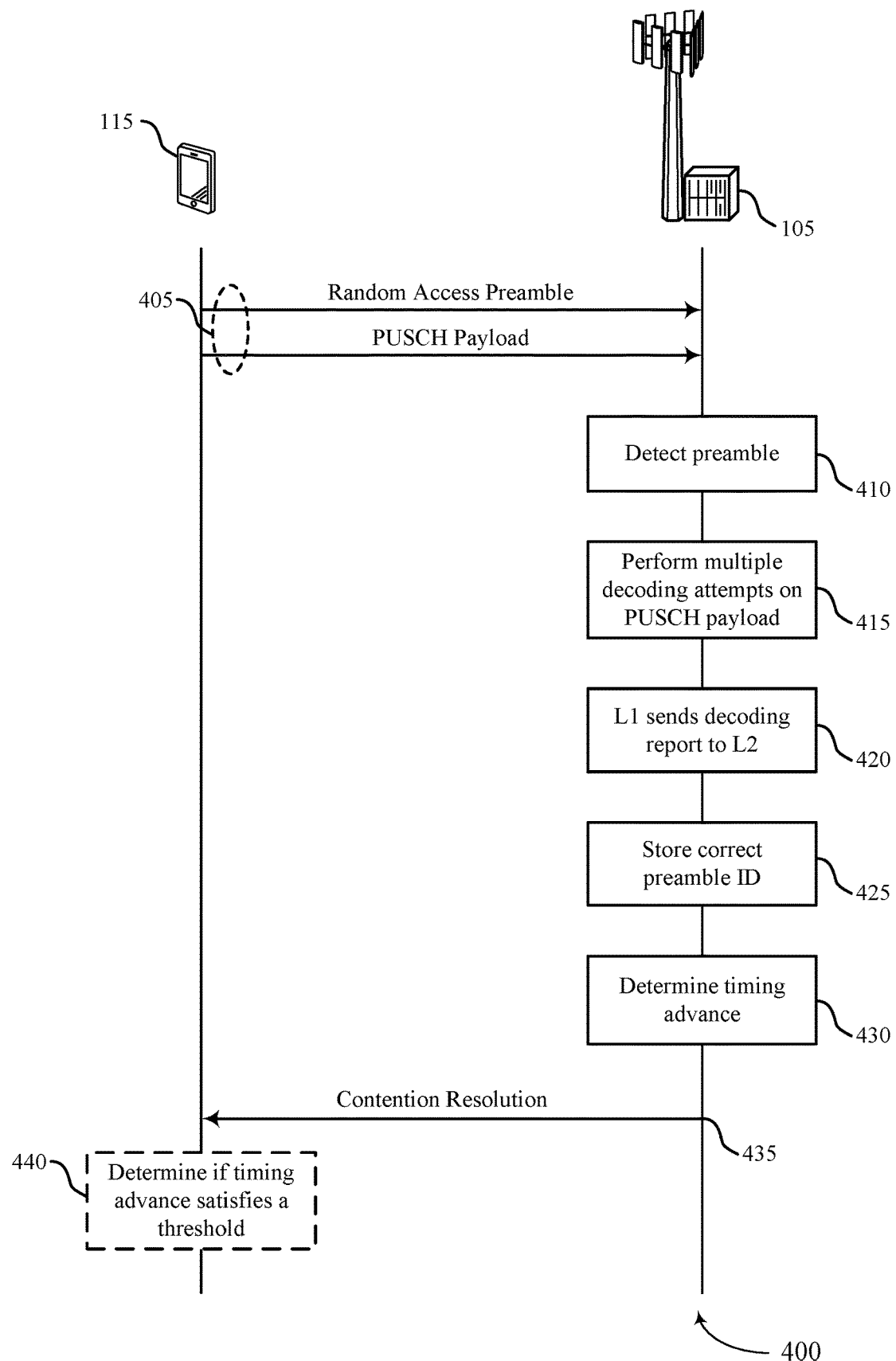
FIGS. 4 through 8 illustrate examples of process flows that support techniques for assisted message decoding in accordance with various aspects of the present disclosure.

FIG. 4 illustrates an example of a process flow 400 that supports techniques for assisted message decoding in accordance with various aspects of the present disclosure. The process flow 400 may implement or be implemented to realize aspects of the wireless communications system 100 or the wireless communications system 200. For example, the process flow 400 illustrates communication between a UE 115 and a base station 105, which may be examples of corresponding devices described herein, including with reference to FIGS. 1 and 2. In some implementations, the base station 105 may detect a preamble index associated with a msgA transmission from the UE 115 and may perform multiple decoding attempts on a payload portion of the msgA transmission using one or more preamble indices that are adjacent to the preamble index detected by the base station 105.

In the following description of the process flow 400, the operations may be performed (such as reported or provided) in a different order than the order shown, or the operations performed by the example devices may be performed in different orders or at different times. Some operations also may be omitted from the process flow 400, or other operations may be added to the process flow 400. Further, although some operations or signaling may be shown to occur at different times for discussion purposes, these operations may actually occur at the same time or otherwise concurrently.

At 405, the base station 105 may receive a first random access message including a first random access preamble on a random access channel (e.g., a PRACH) and a payload on an uplink shared channel (e.g., a PUSCH). For example, the UE 115 may initiate a two-step random access procedure based on transmitting a msgA (e.g., the first random access message) including the first preamble on the PRACH and the payload on the PUSCH.

At 410, the base station 105 may detect a second random access preamble based on receiving the first random access message (e.g., the msgA) at 405. For example, the UE 115 and the base station 105 may experience some timing alignment error and the base station 105 may detect the random access preamble transmitted by the UE 115 in a different preamble window or PRACH receive window than intended by the UE 115, which may result in the base station 105 assuming that the UE 115 transmitted a different random access preamble (e.g., the base station 105 may assume a second random access preamble index instead of a correct first random access preamble index). In some aspects, an L1 entity of the base station 105 may detect the preamble (e.g., the msgA-preamble) and the L1 entity may forward the detected preamble to an L2 entity of the base station 105 (e.g., a MAC entity). In some aspects, the MAC entity of the base station 105 may compute a random access radio network temporary ID (RA-RNTI) using the detected preamble.

At 415, the base station 105 may perform multiple decoding attempts on the PUSCH payload using multiple different random access preambles. In some implementations, for example, the L2 entity of the base station 105 may instruct the L1 entity to decode the payload based on specifying a list of preamble indices. In some aspects, the list of preamble indices may start with the originally detected preamble indices (e.g., as detected at 410) followed by some adjacent preamble indices from a same root sequence index or from one or more different root sequence indices. In some implementations, the L1 entity may receive the list of random access preamble indices based on transmitting an indication of the detected preamble index to the L2 entity at 410. In some other implementations, the L1 entity may autonomously select the list of random access indices (e.g., without signaling from the L2 entity) based on the detected preamble index. Additionally or alternatively the L2 entity may pre-configure the list of preamble indices at the L1 entity that the L1 entity may use for multiple decoding attempts for a given detected preamble index.

The L1 entity of the base station 105 may attempt decoding of the payload (e.g., the msgA-PUSCH) by initializing a scrambling sequence generator with the fir preamble index in the list provided by the L2 entity. If the decoding fails, the L1 entity may perform another de-scrambling and decoding attempt using a next preamble index in the list (e.g., an adjacent preamble index). In some aspects, the base station 105 may stop such a (sequential) de-scrambling and decoding if (e.g., as soon as) a cyclic redundancy check (CRC) correct or pass is achieved for an applied preamble index (e.g., if the decoding of the payload is successful for that applied preamble index). Additionally or alternatively, the base station 105 may perform the processing for all or multiple of the preamble indices provided by the L2 entity in parallel. For example, the base station 105 may perform a first decoding procedure using the second random access preamble index and may perform a second decoding procedure using the first random access preamble index (which may result in a successful decoding of the payload).

At 420, the L1 entity may transmit a payload decoding report indicating that the second decoding attempt for the payload using the first random access preamble index is successful. For example, the L1 entity may send a msgA-PUSCH decoding reporting including the protocol data unit (PDU) index associated with a preamble index and a corresponding decoding status (e.g., a CRC status) to the L2 entity.

At 425, the base station 105 may store, at the L2 entity, the first random access preamble index based on the payload decoding report indicating that the second decoding attempt for the payload using the first random access preamble index is successful. In other words, for example, the L2 entity may receive the msgA-PUSCH decoding report and, if the report indicates that the decoding was successful with a preamble other than the initial or top-most preamble from the list (e.g., the originally detected preamble), the L2 entity may identify or otherwise determine that the preamble detected by the L1 entity is different than the preamble index transmitted by the UE 115 and that the preamble index included in the payload decoding report actually corresponds to the preamble transmitted by the UE 115.

At 430, the base station 105 may determine a timing advance for the UE 115 based on the first random access preamble index and the second random access preamble index. For example, the timing advance may be based on a time offset between a first reception time associated with the first random access preamble (e.g., the preamble actually transmitted by the UE 115) and a second random access preamble associated with the second random access preamble index (e.g., the originally detected preamble index). In other words, the L2 entity may store the correct preamble index and compute a timing advance by taking into consideration the time offset between a latest preamble index (e.g., the correct preamble index) and a previous preamble index (e.g., the originally detected preamble index). The base station 105, at the L2 entity, may include the latest preamble index (e.g., the correct preamble index) and the determined timing advance in a random access response message, such as a msgB-PDSCH or contention resolution message.

At 435, the base station 105 may transmit the contention resolution message to the UE 115. In some examples, the base station 105 may include the contention resolution message in a random access response message (e.g., a msgB-PDSCH). The contention resolution message may include the first random access preamble index corresponding to the first random access preamble transmitted by the UE 115 and the timing advance.

At 440, the UE 115 may, in some implementations, determine whether the timing advance satisfies a threshold and may establish a connection with the base station 105 based on whether the timing advance satisfies the threshold. For example, if the UE 115 determines that the timing advance satisfies the threshold, the UE 115 may establish a connection with the base station based on the contention resolution message sent at 435. Alternatively, if the UE 115 determines that the timing advance fails to satisfy the threshold (e.g., is too big), the UE 115 may attempt to establish a connection with the base station 105 based on different random access signaling (e.g., via another random access procedure).

Figure 5:
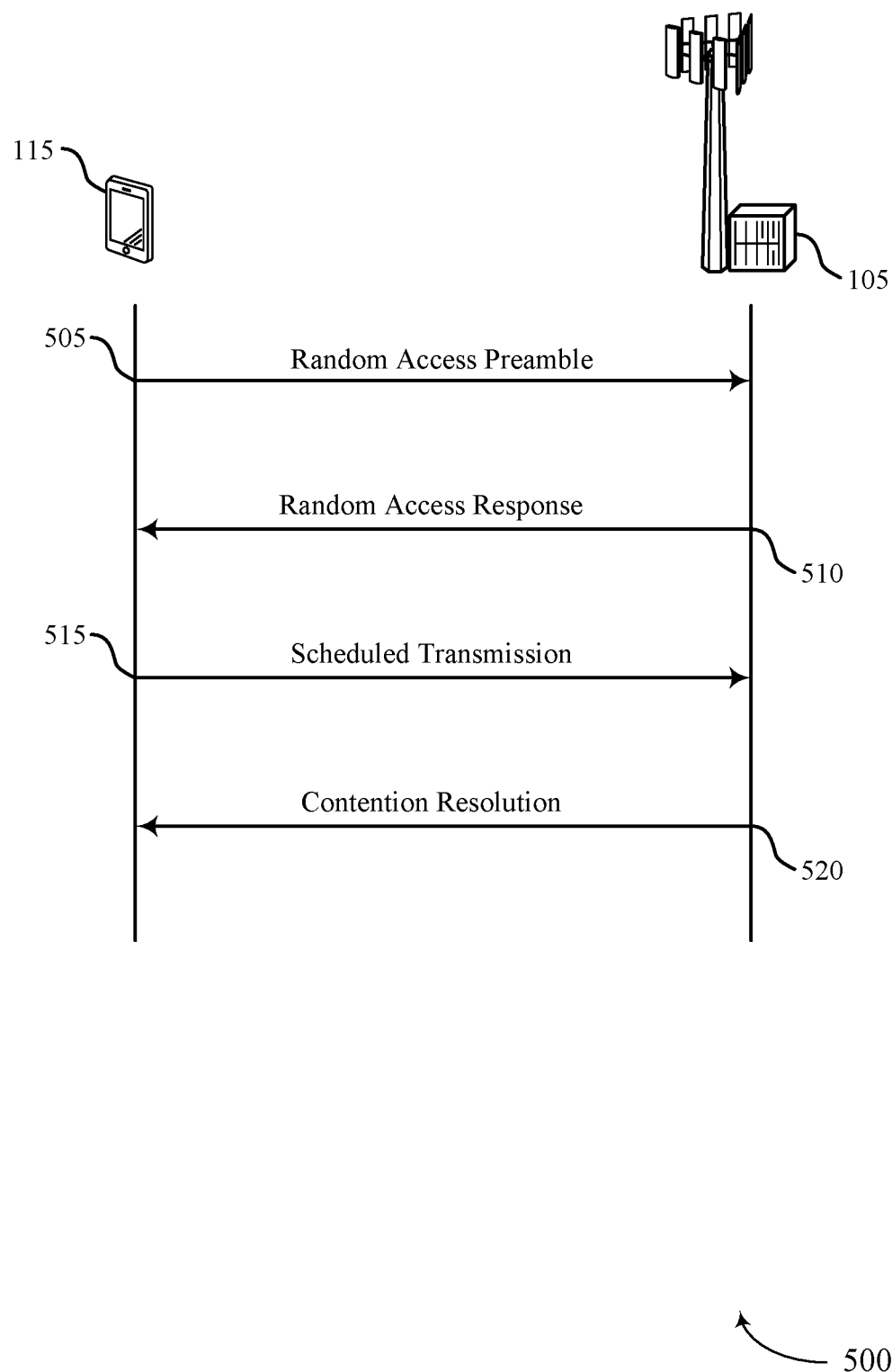

FIG. 5 illustrates an example of a process flow 500 that supports techniques for assisted message decoding in accordance with various aspects of the present disclosure. The process flow 500 may implement or be implemented to realize aspects of the wireless communications system 100 or the wireless communications system 200. For example, the process flow 500 illustrates communication between a UE 115 and a base station 105, which may be examples of corresponding devices described herein, including with reference to FIGS. 1 and 2. In some implementations, the base station 105 may detect a preamble index associated with an initial random access transmission from the UE 115 and may perform multiple decoding attempts on a payload portion of the transmission using one or more preamble indices that are adjacent to the preamble index detected by the base station 105. In some aspects, the process flow 500 illustrates an example of a contention-based random access (CBRA) four-step random access procedure.

In the following description of the process flow 500, the operations may be performed (such as reported or provided) in a different order than the order shown, or the operations performed by the example devices may be performed in different orders or at different times. Some operations also may be omitted from the process flow 500, or other operations may be added to the process flow 500. Further, although some operations or signaling may be shown to occur at different times for discussion purposes, these operations may actually occur at the same time or otherwise concurrently.

At 505, the UE 115 may transmit, to the base station 105, a random access preamble. In some aspects, the UE 115 may transmit the random access preamble via a msg1.

At 510, the base station 105 may transmit, to the UE 115, a random access response associated with the random access preamble transmitted by the UE 115 at 505. In some aspects, the base station 105 may transmit the random access response via a msg2.

At 515, the UE 115 may perform, to the base station 105, a scheduled transmission. For example, the random access response may allocate an uplink resource, such as a PUSCH resource, for the UE 115 to use for the scheduled transmission and the UE 115 may perform the scheduled transmission over the allocated uplink resource accordingly. In some aspects, the UE 115 may perform the scheduled transmission via a msg3.

At 520, the base station 105 may transmit, to the UE 115, a contention resolution message. In some aspects, the base station 105 may transmit the contention resolution message via a msg4 and the contention resolution message may include information for the UE 115 to use to establish a connection with the base station 105.

Figure 6:
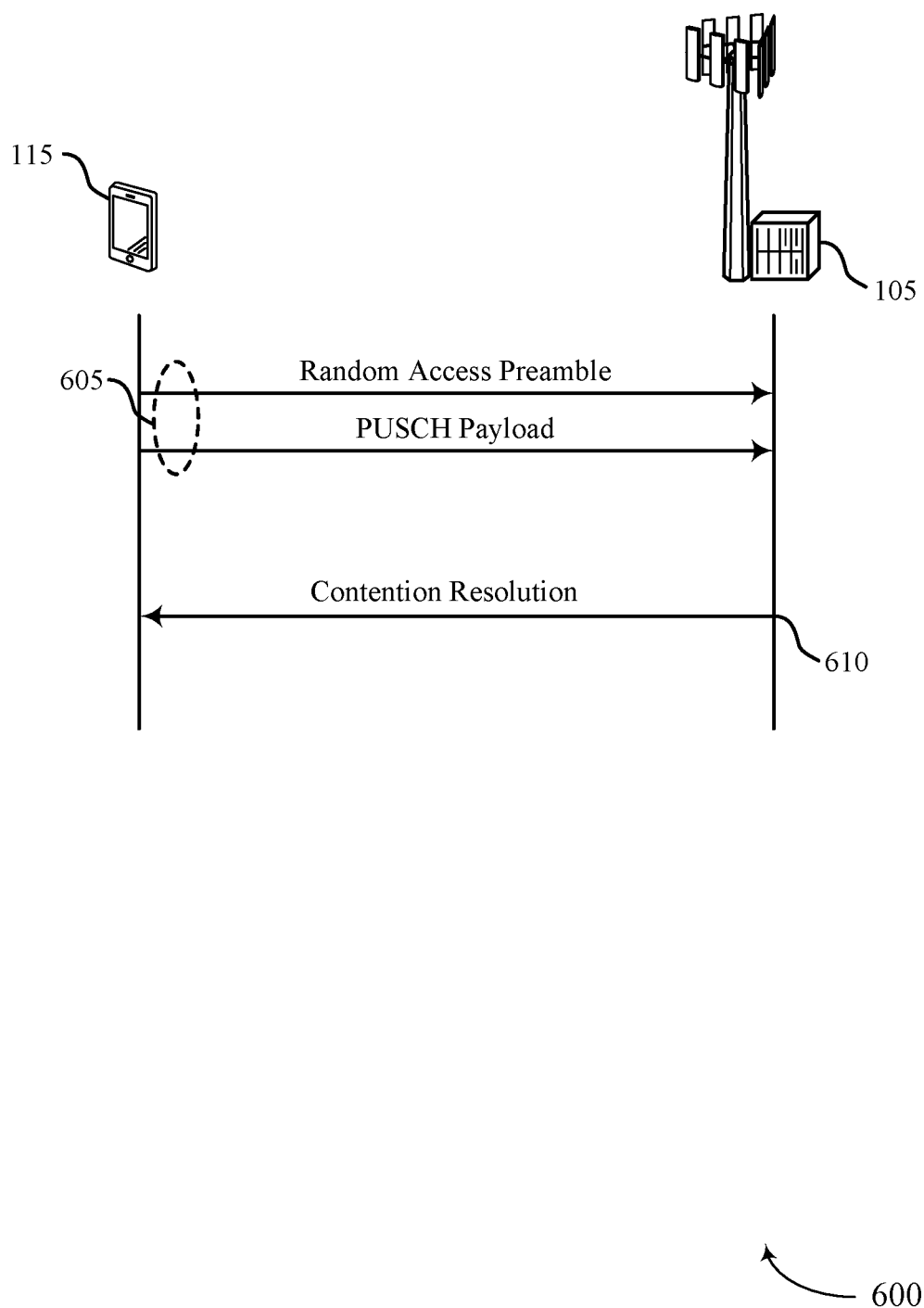

FIG. 6 illustrates an example of a process flow 600 that supports techniques for assisted message decoding in accordance with various aspects of the present disclosure. The process flow 600 may implement or be implemented to realize aspects of the wireless communications system 100 or the wireless communications system 200. For example, the process flow 600 illustrates communication between a UE 115 and a base station 105, which may be examples of corresponding devices described herein, including with reference to FIGS. 1 and 2. In some implementations, the base station 105 may detect a preamble index associated with an initial random access transmission from the UE 115 and may perform multiple decoding attempts on a payload portion of the transmission using one or more preamble indices that are adjacent to the preamble index detected by the base station 105. In some aspects, the process flow 600 illustrates an example of a CBRA two-step random access procedure.

In the following description of the process flow 600, the operations may be performed (such as reported or provided) in a different order than the order shown, or the operations performed by the example devices may be performed in different orders or at different times. Some operations also may be omitted from the process flow 600, or other operations may be added to the process flow 600. Further, although some operations or signaling may be shown to occur at different times for discussion purposes, these operations may actually occur at the same time or otherwise concurrently.

At 605, the UE 115 may transmit, to the base station 105, a random access message including a random access preamble on a PRACH and a payload on a PUSCH. In some aspects, the UE 115 may scramble and encode the payload based on the random access preamble. In some aspects, the UE 115 may transmit the random access message via a msgA.

At 610, the base station 105 may transmit a contention resolution message. In some aspects, the base station 105 may transmit the contention resolution message via a msgB and the contention resolution message may include information for the UE 115 to use to establish a connection with the base station 105.

Figure 7:
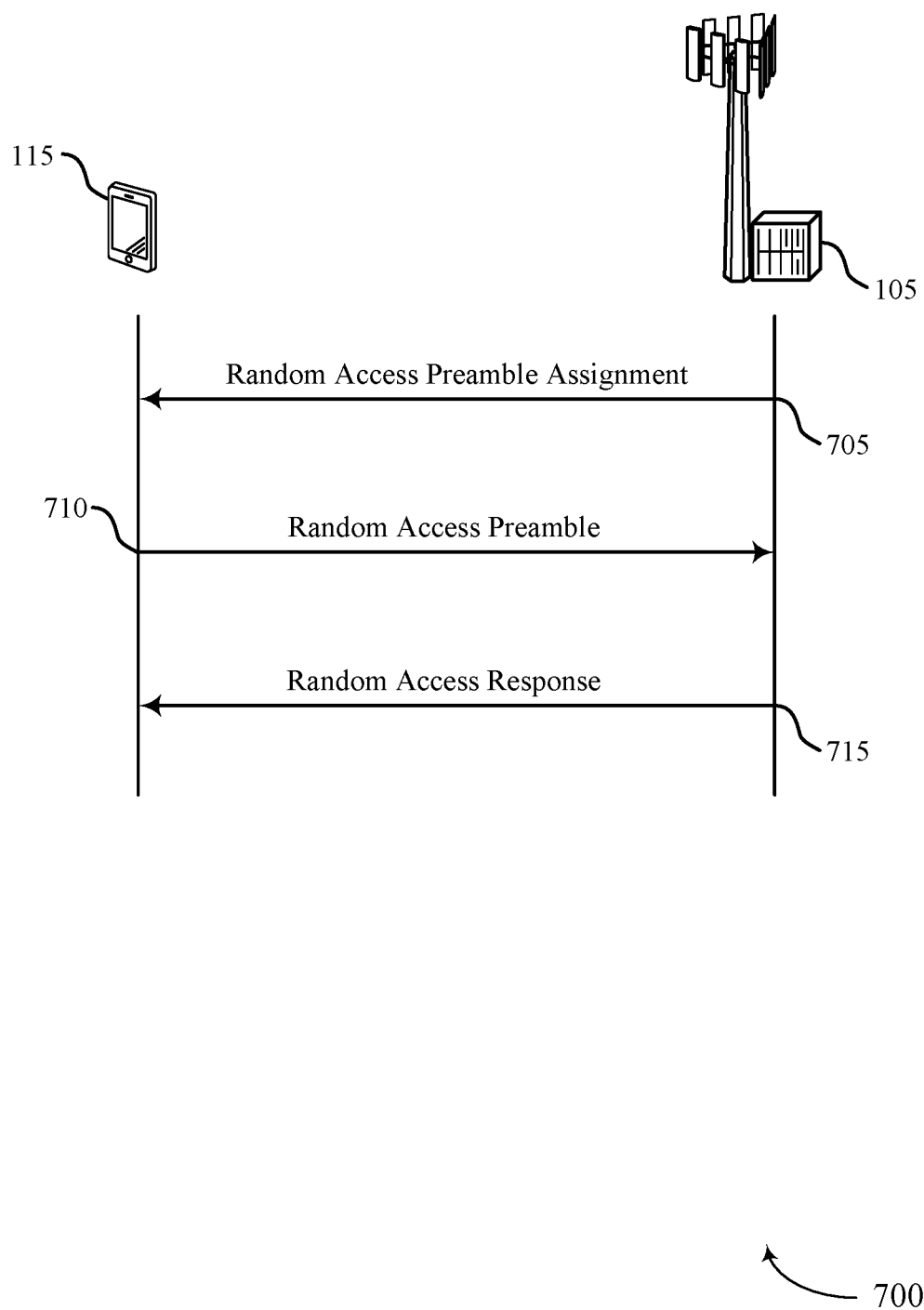

FIG. 7 illustrates an example of a process flow 700 that supports techniques for assisted message decoding in accordance with various aspects of the present disclosure. The process flow 700 may implement or be implemented to realize aspects of the wireless communications system 100 or the wireless communications system 200. For example, the process flow 700 illustrates communication between a UE 115 and a base station 105, which may be examples of corresponding devices described herein, including with reference to FIGS. 1 and 2. In some implementations, the base station 105 may detect a preamble index associated with an initial random access transmission from the UE 115 and may perform multiple decoding attempts on a payload portion of the transmission using one or more preamble indices that are adjacent to the preamble index detected by the base station 105. In some aspects, the process flow 700 illustrates an example of a contention-free random access (CFRA) four-step random access procedure.

In the following description of the process flow 700, the operations may be performed (such as reported or provided) in a different order than the order shown, or the operations performed by the example devices may be performed in different orders or at different times. Some operations also may be omitted from the process flow 700, or other operations may be added to the process flow 700. Further, although some operations or signaling may be shown to occur at different times for discussion purposes, these operations may actually occur at the same time or otherwise concurrently.

At 705, the base station 105 may transmit, to the UE 115, a random access preamble assignment. In some aspects, the random access preamble assignment may indicate which random access preamble the UE 115 may select to transmit as part of a random access procedure with the base station 105.

At 710, the UE 115 may transmit, to the base station 105, a random access preamble. The UE 115 may transmit the same random access preamble as indicated by the random access preamble assignment transmitted by the base station 105 at 705. In some aspects, the UE 115 may transmit the random access preamble via a msg1.

At 715, the base station 105 may transmit, to the UE 115, a random access response associated with the random access preamble transmitted by the UE 115 at 710. In some aspects, the base station 105 may transmit the random access response via a msg2. As part of the CFRA four-step random access procedure, the UE 115 may establish a connection with the base station 105 based on receiving the random access response at 715.

Figure 8:
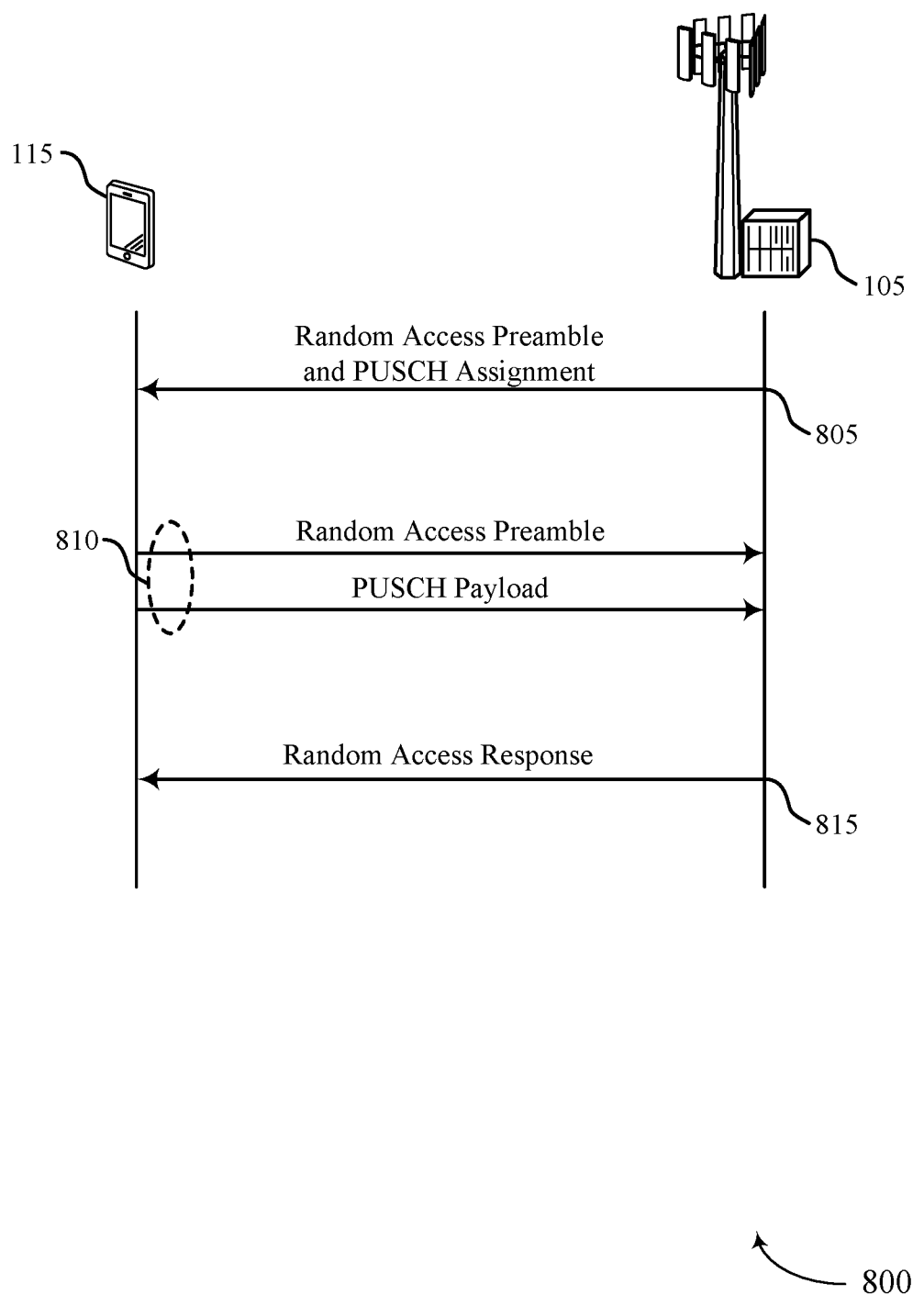

FIG. 8 illustrates an example of a process flow 800 that supports techniques for assisted message decoding in accordance with various aspects of the present disclosure. The process flow 800 may implement or be implemented to realize aspects of the wireless communications system 100 or the wireless communications system 200. For example, the process flow 800 illustrates communication between a UE 115 and a base station 105, which may be examples of corresponding devices described herein, including with reference to FIGS. 1 and 2. In some implementations, the base station 105 may detect a preamble index associated with an initial random access transmission from the UE 115 and may perform multiple decoding attempts on a payload portion of the transmission using one or more preamble indices that are adjacent to the preamble index detected by the base station 105. In some aspects, the process flow 800 illustrates an example of a CFRA two-step random access procedure.

In the following description of the process flow 800, the operations may be performed (such as reported or provided) in a different order than the order shown, or the operations performed by the example devices may be performed in different orders or at different times. Some operations also may be omitted from the process flow 800, or other operations may be added to the process flow 800. Further, although some operations or signaling may be shown to occur at different times for discussion purposes, these operations may actually occur at the same time or otherwise concurrently.

At 805, the base station 105 may transmit, to the UE 115, a random access preamble and PUSCH assignment. In some aspects, the random access preamble assignment may indicate which random access preamble the UE 115 may select to transmit as part of the random access procedure with the base station 105 and the PUSCH assignment may indicate over which PUSCH resource the UE 115 is scheduled to transmit a payload associated with the random access preamble.

At 810, the UE 115 may transmit, to the base station 105, a random access message including the random access preamble on a PRACH and the payload on the PUSCH. In some aspects, the UE 115 may scramble and encode the payload based on the random access preamble. The UE 115 may transmit the same random access preamble as indicated by the random access preamble assignment transmitted by the base station 105 at 805 and may transmit the payload over the same PUSCH resource as indicated by the PUSCH assignment transmitted by the base station 105 at 805. In some aspects, the UE 115 may transmit the random access message via a msgA.

At 815, the base station 105 may transmit, to the UE 115, a random access response associated with the random access preamble transmitted by the UE 115 at 810. In some aspects, the base station 105 may transmit the random access response via a msgB. As part of the CFRA two-step random access procedure, the UE 115 may establish a connection with the base station 105 based on receiving the random access response at 815.

Figure 9:
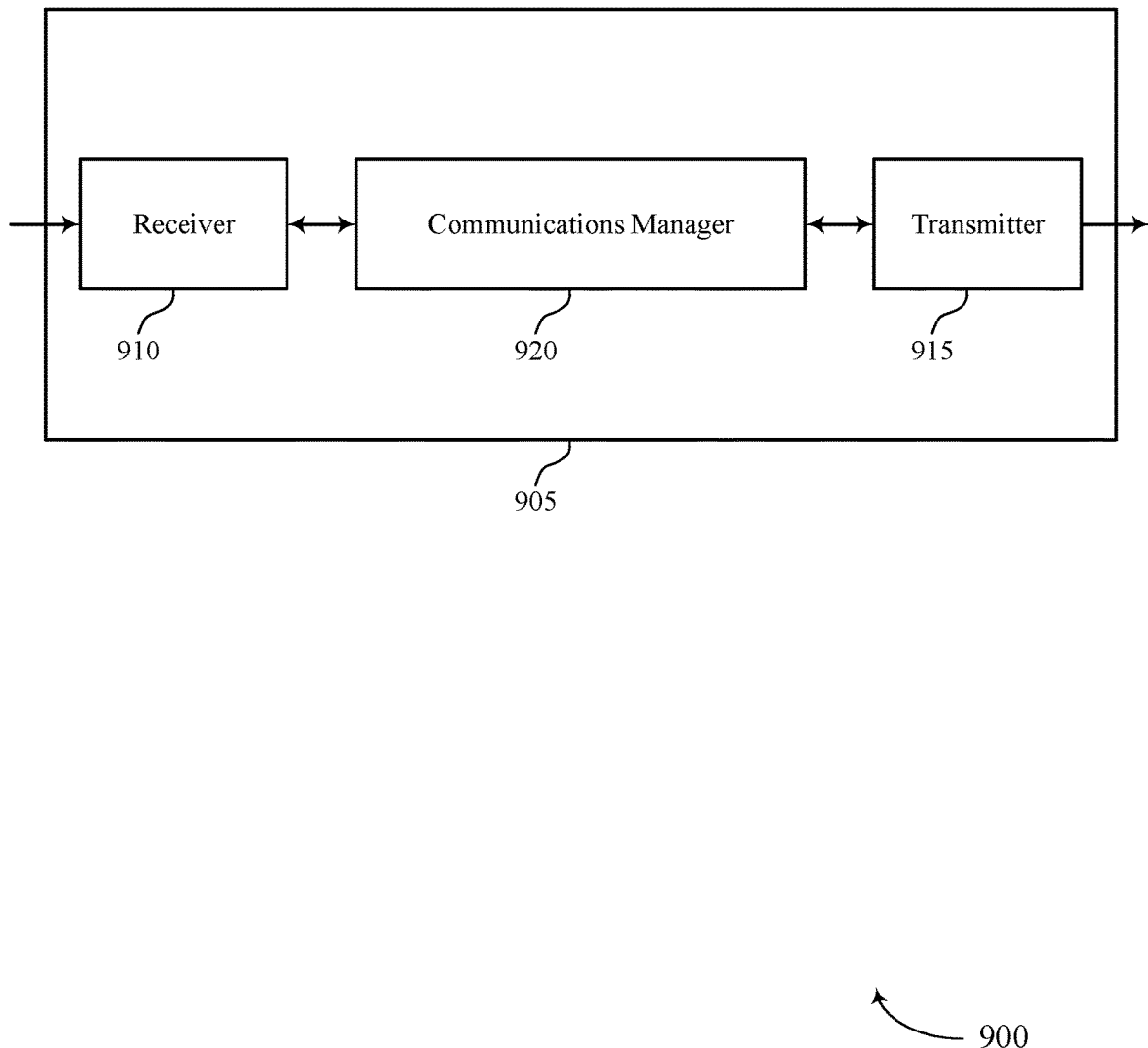
FIGS. 9 and 10 show block diagrams of devices that support techniques for assisted message decoding in accordance with various aspects of the present disclosure.

FIG. 9 shows a block diagram 900 of a device 905 that supports techniques for assisted message decoding in accordance with various aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for assisted message decoding). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for assisted message decoding). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for assisted message decoding as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first device in accordance with various aspects of the present disclosure. For example, the communications manager 920 may be configured as or otherwise support a means for receiving, from a second device, a first random access message including a first random access preamble on a random access channel and a payload on an uplink shared channel. The communications manager 920 may be configured as or otherwise support a means for performing a first decoding attempt for the payload using a second random access preamble index, the first decoding attempt being performed in response to receiving the first random access message. The communications manager 920 may be configured as or otherwise support a means for performing a second decoding attempt for the payload using a first random access preamble index associated with the first random access preamble. The communications manager 920 may be configured as or otherwise support a means for transmitting, to the second device, a random access response message that includes an indication of the first random access preamble index, the transmitting of the random access response message based on successfully performing the second decoding attempt.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Figure 10:
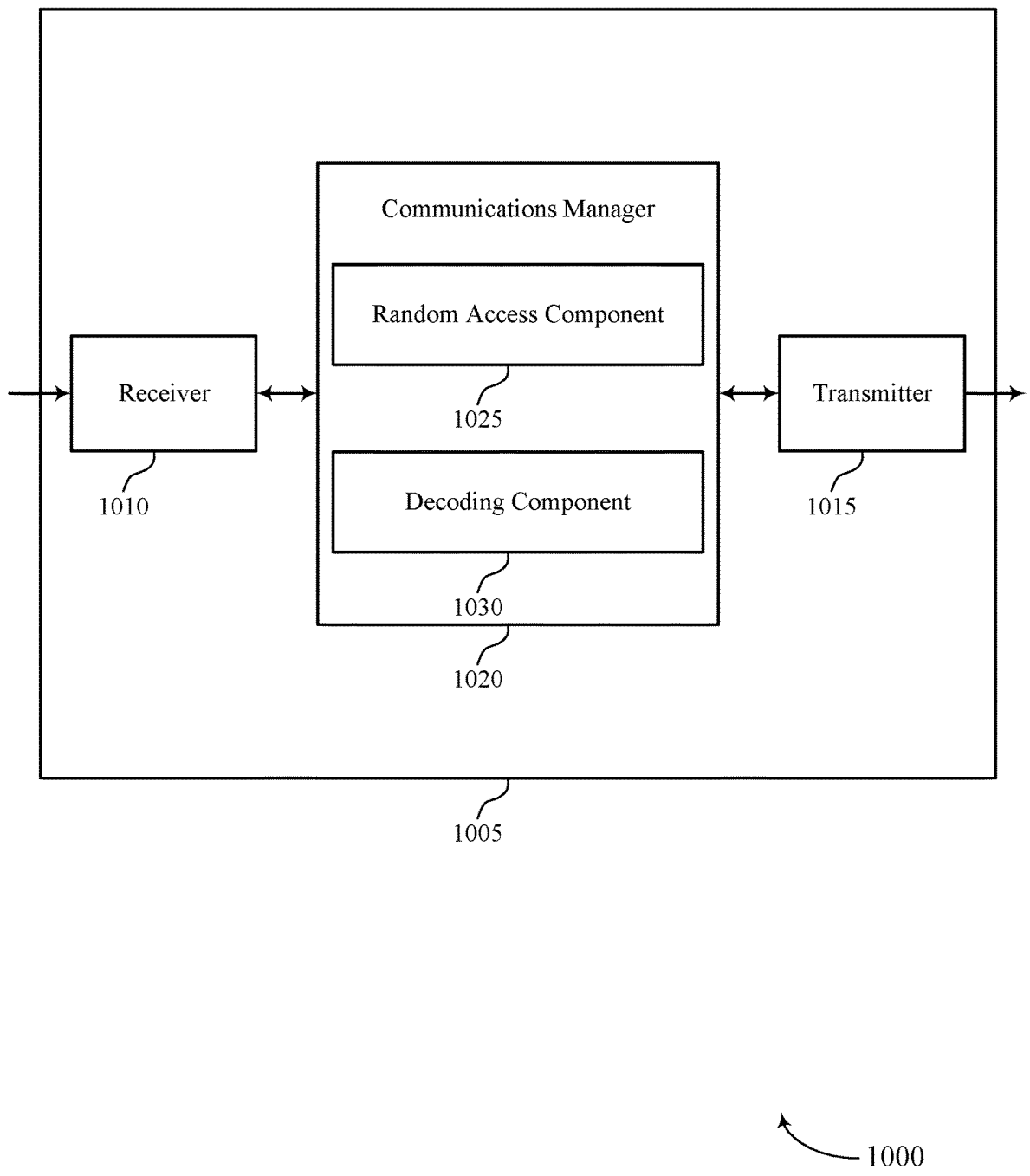

FIG. 10 shows a block diagram 1000 of a device 1005 that supports techniques for assisted message decoding in accordance with various aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for assisted message decoding). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for assisted message decoding). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for assisted message decoding as described herein. For example, the communications manager 1020 may include a random access component 1025 a decoding component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first device in accordance with various aspects of the present disclosure. The random access component 1025 may be configured as or otherwise support a means for receiving, from a second device, a first random access message including a first random access preamble on a random access channel and a payload on an uplink shared channel. The decoding component 1030 may be configured as or otherwise support a means for performing a first decoding attempt for the payload using a second random access preamble index, the first decoding attempt being performed in response to receiving the first random access message. The decoding component 1030 may be configured as or otherwise support a means for performing a second decoding attempt for the payload using a first random access preamble index associated with the first random access preamble. The random access component 1025 may be configured as or otherwise support a means for transmitting, to the second device, a random access response message that includes an indication of the first random access preamble index, the transmitting of the random access response message based on successfully performing the second decoding attempt.

Figure 11:
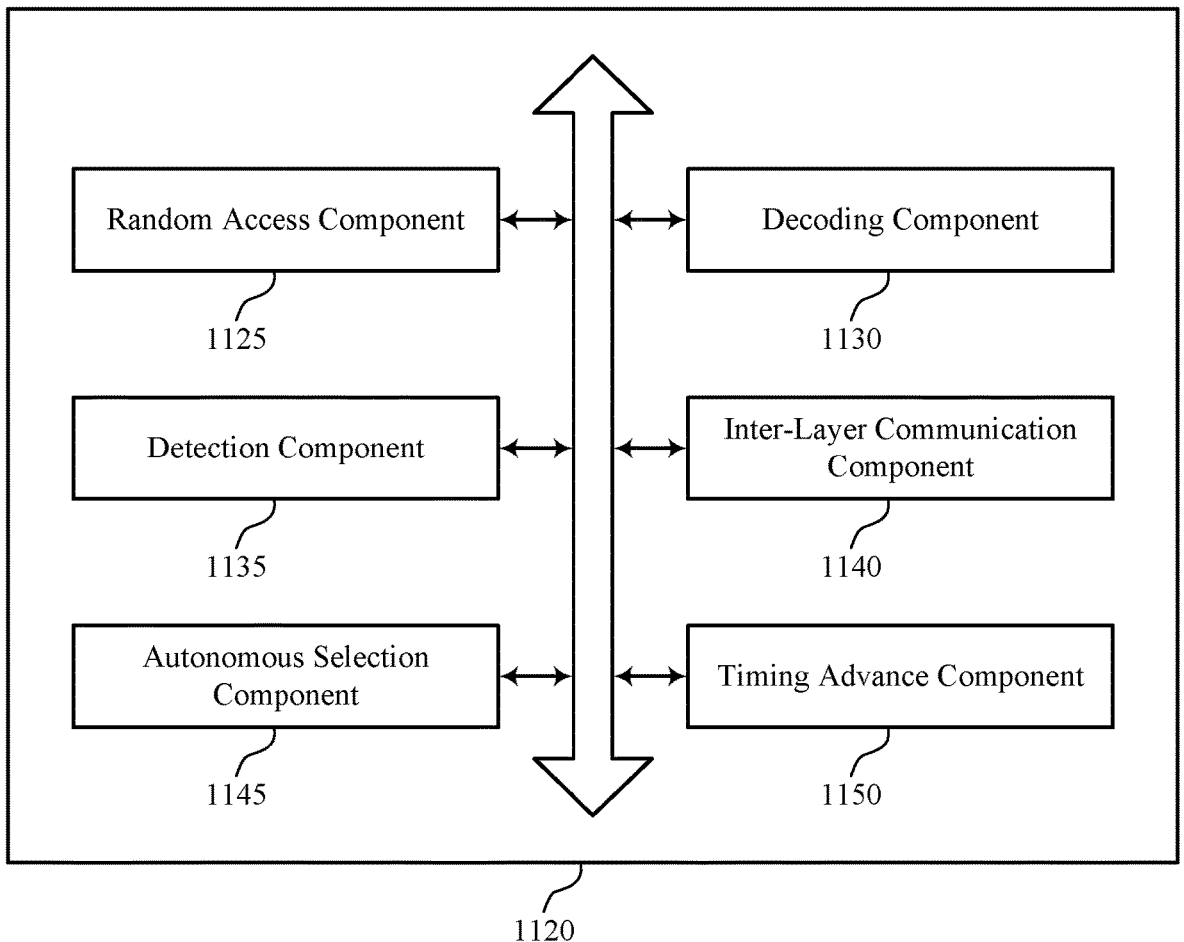
FIG. 11 shows a block diagram of a communications manager that supports techniques for assisted message decoding in accordance with various aspects of the present disclosure.

FIG. 11 shows a block diagram 1100 of a communications manager 1120 that supports techniques for assisted message decoding in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for assisted message decoding as described herein. For example, the communications manager 1120 may include a random access component 1125, a decoding component 1130, a detection component 1135, an inter-layer communication component 1140, an autonomous selection component 1145, a timing advance component 1150, or any combination thereof. Each of these components may communicate, directly or indirectly, with one another (e.g., via one or more buses).

The communications manager 1120 may support wireless communication at a first device in accordance with various aspects of the present disclosure. The random access component 1125 may be configured as or otherwise support a means for receiving, from a second device, a first random access message including a first random access preamble on a random access channel and a payload on an uplink shared channel. The decoding component 1130 may be configured as or otherwise support a means for performing a first decoding attempt for the payload using a second random access preamble index, the first decoding attempt being performed in response to receiving the first random access message. In some examples, the decoding component 1130 may be configured as or otherwise support a means for performing a second decoding attempt for the payload using a first random access preamble index associated with the first random access preamble. In some examples, the random access component 1125 may be configured as or otherwise support a means for transmitting, to the second device, a random access response message that includes an indication of the first random access preamble index, the transmitting of the random access response message based on successfully performing the second decoding attempt.

In some examples, the detection component 1135 may be configured as or otherwise support a means for detecting a second random access preamble based on a reception time associated with the first random access message, where performing the first decoding attempt for the payload using the second random access preamble index is based on detecting the second random access preamble.

In some examples, the inter-layer communication component 1140 may be configured as or otherwise support a means for receiving, at a L1 entity of the first device from a L2 entity of the first device, a set of multiple random access preamble indices including the first random access preamble index and the second random access preamble index, where performing the first decoding attempt and the second decoding attempt is based on receiving the set of multiple random access preamble indices.

In some examples, the set of multiple random access preamble indices include the second random access preamble index and one or more adjacent random access preamble indices from a set of available random access preamble indices that are associated with a same root sequence index as the second random access preamble index.

In some examples, the one or more adjacent random access preamble indices that are associated with the same root sequence are identified from the set of available random access preamble indices based on one or more of a zero correlation zone configuration, a length of a random access sequence, a random access channel format, and a random access channel SCS.

In some examples, the set of multiple random access preamble indices include the second random access preamble index and one or more adjacent random access preamble indices from a set of available random access preamble indices that are associated with different root sequence indices.

In some examples, the inter-layer communication component 1140 may be configured as or otherwise support a means for transmitting, from the L1 entity to the L2 entity, an indication of the second random access preamble index based on detecting a second random access preamble, where receiving the set of multiple random access preamble indices is based on transmitting the indication of the second random access preamble index.

In some examples, the autonomous selection component 1145 may be configured as or otherwise support a means for selecting, at a L1 entity of the first device without signaling from a L2 entity of the first device, a set of multiple random access preamble indices including the first random access preamble index and the second random access preamble index, where performing the first decoding attempt and the second decoding attempt is based on selecting the set of multiple random access preamble indices.

In some examples, the inter-layer communication component 1140 may be configured as or otherwise support a means for transmitting, from a L1 entity of the first device to a L2 entity of the first device, a payload decoding report indicating that the second decoding attempt for the payload using the first random access preamble index is successful. In some examples, the random access component 1125 may be configured as or otherwise support a means for storing, at the L2 entity of the first device, the first random access preamble based on the payload decoding report indicating that the second decoding attempt for the payload using the first random access preamble index is successful.

In some examples, the timing advance component 1150 may be configured as or otherwise support a means for determining a timing advance for the UE based on the first random access preamble index and the second random access preamble index, where the random access response message further includes an indication of the timing advance.

In some examples, the timing advance is based on a time offset between a first reception time associated with the first random access preamble and a second random access preamble associated with the second random access preamble index.

In some examples, to support performing the second decoding attempt, the decoding component 1130 may be configured as or otherwise support a means for performing the second decoding attempt subsequent to the first decoding attempt based on a result of the first decoding attempt being unsuccessful.

In some examples, to support performing the first decoding attempt and the second decoding attempt, the decoding component 1130 may be configured as or otherwise support a means for performing the first decoding attempt for the payload using the second random access preamble index and the second decoding attempt for the payload using the first random access preamble index in parallel.

In some examples, performing the first decoding attempt for the payload using the second random access preamble index includes using a second scrambling sequence generation based on the second random access preamble index. In some examples, performing the second decoding attempt for the payload using the first random access preamble index includes using a first scrambling sequence generation based on the first random access preamble index.

In some examples, the first random access message includes a message A of a two-step random access procedure and the random access response message includes a message B of the two-step random access procedure.

Figure 12:
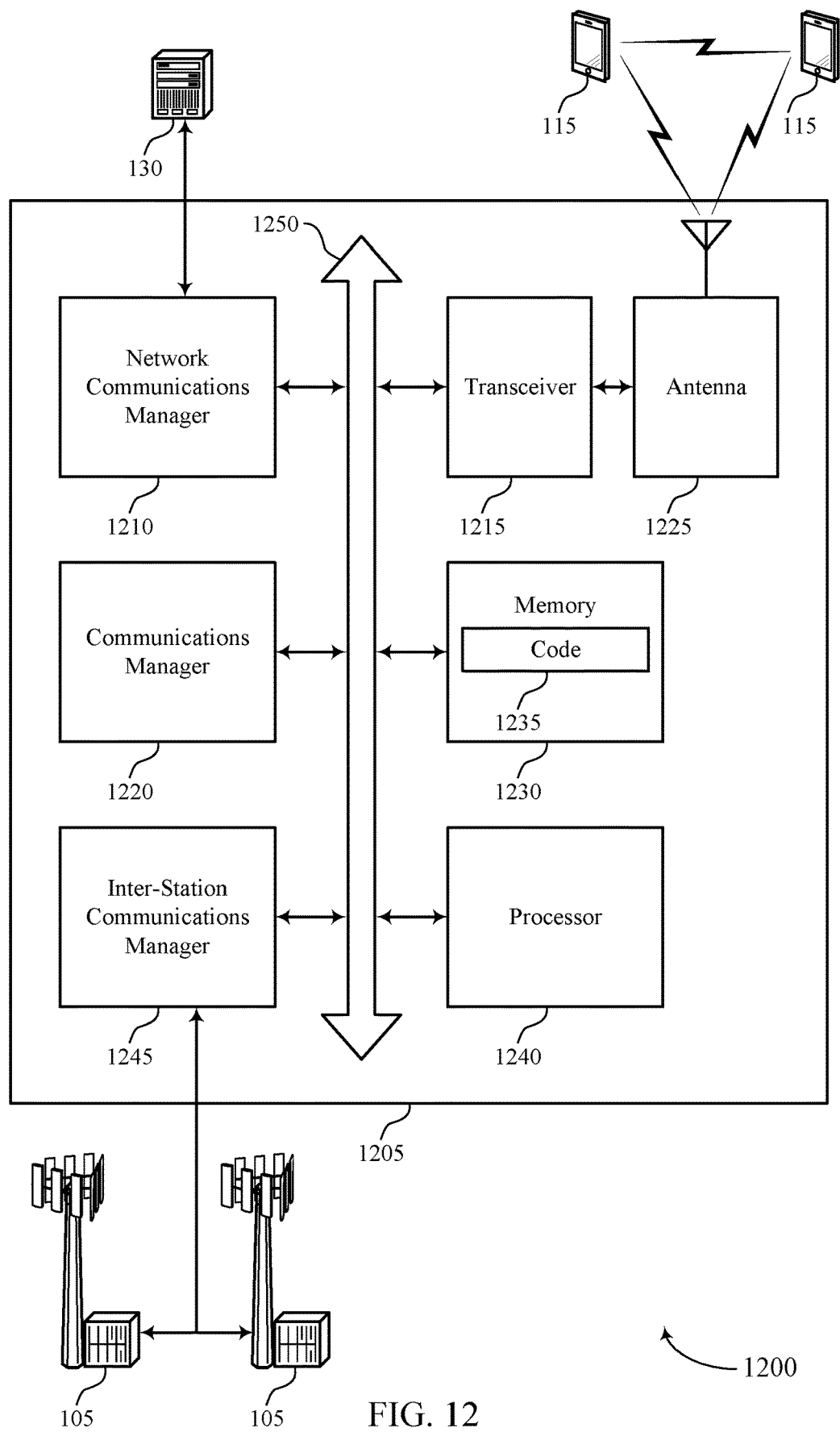
FIG. 12 shows a diagram of a system including a device that supports techniques for assisted message decoding in accordance with various aspects of the present disclosure.

FIG. 12 shows a diagram of a system 1200 including a device 1205 that supports techniques for assisted message decoding in accordance with various aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic input/output (I/O) system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for assisted message decoding). For example, the device 1205 or a component of the device 1205 may include a processor 1240 and memory 1230 coupled with the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a first device in accordance with various aspects of the present disclosure. For example, the communications manager 1220 may be configured as or otherwise support a means for receiving, from a second device, a first random access message including a first random access preamble on a random access channel and a payload on an uplink shared channel. The communications manager 1220 may be configured as or otherwise support a means for performing a first decoding attempt for the payload using a second random access preamble index, the first decoding attempt being performed in response to receiving the first random access message. The communications manager 1220 may be configured as or otherwise support a means for performing a second decoding attempt for the payload using a first random access preamble index associated with the first random access preamble. The communications manager 1220 may be configured as or otherwise support a means for transmitting, to the second device, a random access response message that includes an indication of the first random access preamble index, the transmitting of the random access response message based on successfully performing the second decoding attempt.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for assisted message decoding as described herein, or the processor 1240 and the memory 1230 may be otherwise configured to perform or support such operations.

Figure 13:
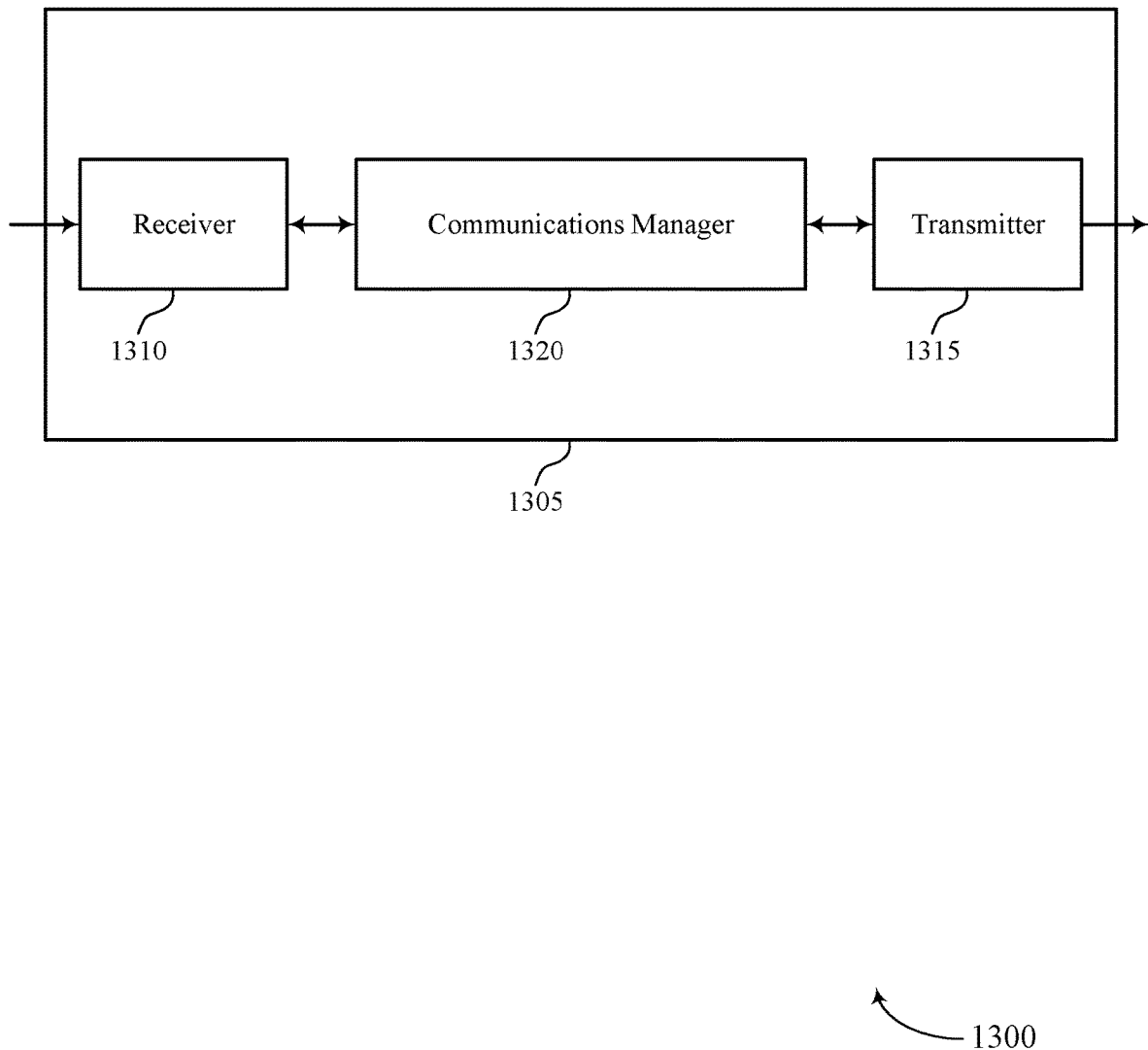
FIGS. 13 and 14 show block diagrams of devices that support techniques for assisted message decoding in accordance with various aspects of the present disclosure.

FIG. 13 shows a block diagram 1300 of a device 1305 that supports techniques for assisted message decoding in accordance with various aspects of the present disclosure. The device 1305 may be an example of aspects of a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for assisted message decoding). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for assisted message decoding). In some examples, the transmitter 1315 may be co-located with a receiver 1310 in a transceiver component. The transmitter 1315 may utilize a single antenna or a set of multiple antennas.

The communications manager 1320, the receiver 1310, the transmitter 1315, or various combinations thereof or various components thereof may be examples of means for performing various aspects of techniques for assisted message decoding as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, a FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a second device in accordance with various aspects of the present disclosure. For example, the communications manager 1320 may be configured as or otherwise support a means for transmitting, to a first device, a first random access message including a first random access preamble on a random access channel and a payload on an uplink shared channel. The communications manager 1320 may be configured as or otherwise support a means for receiving, from the first device, a random access response message that includes an indication of the first random access preamble and a timing advance. The communications manager 1320 may be configured as or otherwise support a means for determining whether the timing advance satisfies a threshold. The communications manager 1320 may be configured as or otherwise support a means for establishing a connection with the first device based on whether the timing advance satisfies the threshold.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing, reduced power consumption, and more efficient utilization of communication resources.

Figure 14:
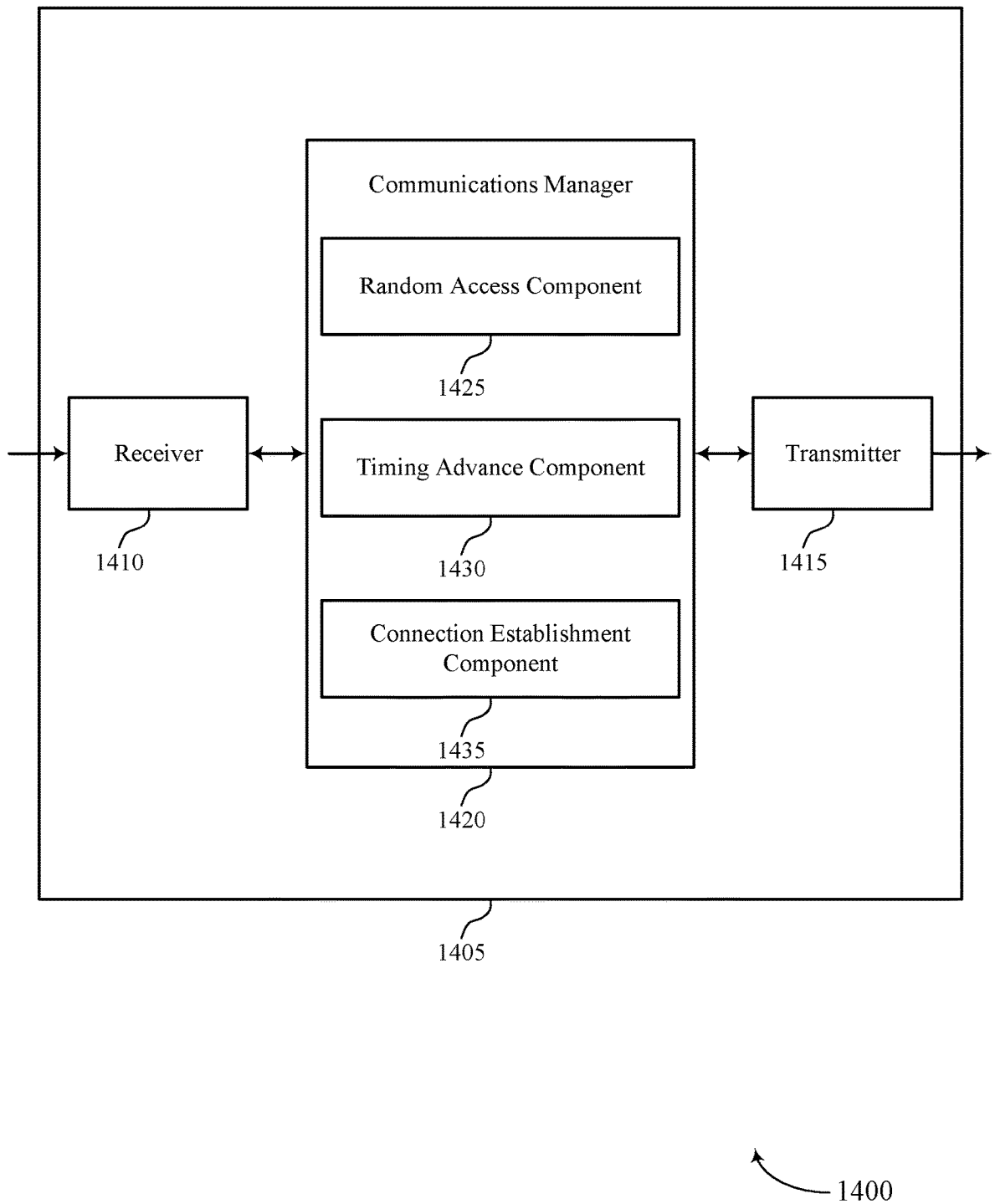

FIG. 14 shows a block diagram 1400 of a device 1405 that supports techniques for assisted message decoding in accordance with various aspects of the present disclosure. The device 1405 may be an example of aspects of a device 1305 or a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for assisted message decoding). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for assisted message decoding). In some examples, the transmitter 1415 may be co-located with a receiver 1410 in a transceiver component. The transmitter 1415 may utilize a single antenna or a set of multiple antennas.

The device 1405, or various components thereof, may be an example of means for performing various aspects of techniques for assisted message decoding as described herein. For example, the communications manager 1420 may include a random access component 1425, a timing advance component 1430, a connection establishment component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a second device in accordance with various aspects of the present disclosure. The random access component 1425 may be configured as or otherwise support a means for transmitting, to a first device, a first random access message including a first random access preamble on a random access channel and a payload on an uplink shared channel. The random access component 1425 may be configured as or otherwise support a means for receiving, from the first device, a random access response message that includes an indication of the first random access preamble and a timing advance. The timing advance component 1430 may be configured as or otherwise support a means for determining whether the timing advance satisfies a threshold. The connection establishment component 1435 may be configured as or otherwise support a means for establishing a connection with the first device based on whether the timing advance satisfies the threshold.

Figure 15:
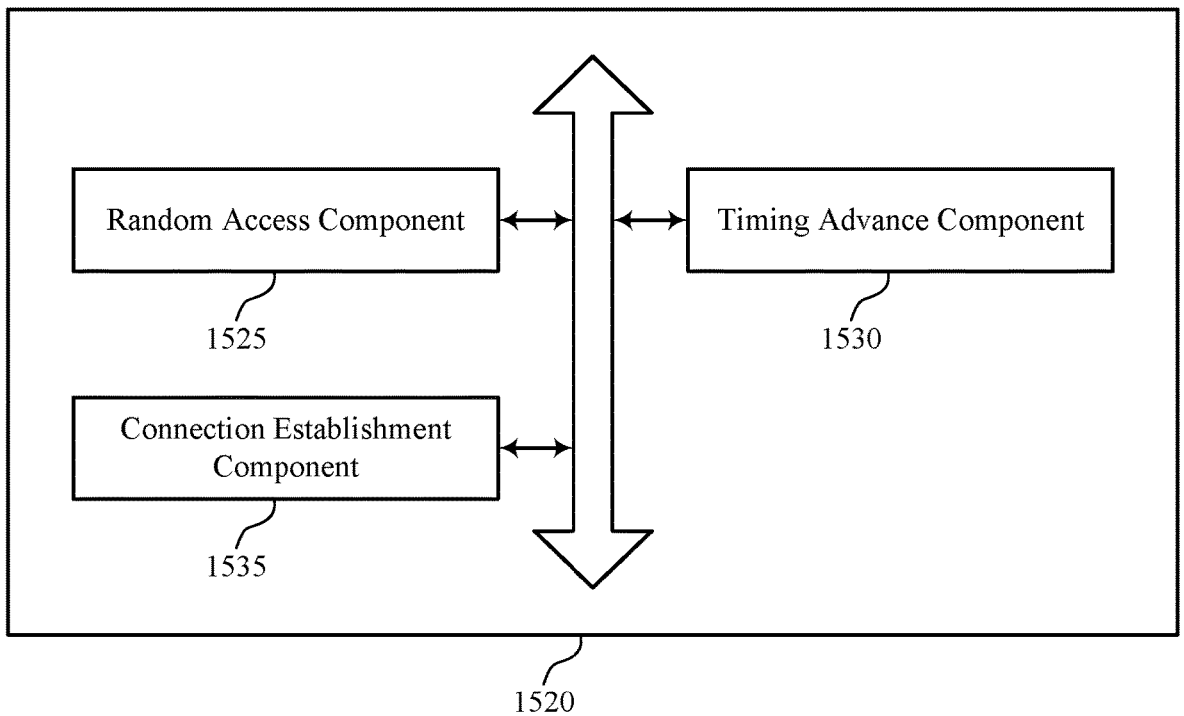
FIG. 15 shows a block diagram of a communications manager that supports techniques for assisted message decoding in accordance with various aspects of the present disclosure.

FIG. 15 shows a block diagram 1500 of a communications manager 1520 that supports techniques for assisted message decoding in accordance with various aspects of the present disclosure. The communications manager 1520 may be an example of aspects of a communications manager 1320, a communications manager 1420, or both, as described herein. The communications manager 1520, or various components thereof, may be an example of means for performing various aspects of techniques for assisted message decoding as described herein. For example, the communications manager 1520 may include a random access component 1525, a timing advance component 1530, a connection establishment component 1535, or any combination thereof. Each of these components may communicate, directly or indirectly, with one another (e.g., via one or more buses).

The communications manager 1520 may support wireless communication at a second device in accordance with various aspects of the present disclosure. The random access component 1525 may be configured as or otherwise support a means for transmitting, to a first device, a first random access message including a first random access preamble on a random access channel and a payload on an uplink shared channel. In some examples, the random access component 1525 may be configured as or otherwise support a means for receiving, from the first device, a random access response message that includes an indication of the first random access preamble and a timing advance. The timing advance component 1530 may be configured as or otherwise support a means for determining whether the timing advance satisfies a threshold. The connection establishment component 1535 may be configured as or otherwise support a means for establishing a connection with the first device based on whether the timing advance satisfies the threshold.

In some examples, determining whether the timing advance satisfies the threshold includes determining that the timing advance satisfies the threshold. In some examples, establishing the connection with the first device includes establishing the connection based on the random access response message.

In some examples, determining whether the timing advance satisfies the threshold includes determining that the timing advance fails to satisfy the threshold. In some examples, establishing the connection with the first device includes establishing the connection based on different random access signaling.

In some examples, the first random access message includes a message A of a two-step random access procedure and the random access response message includes a message B of the two-step random access procedure.

Figure 16:
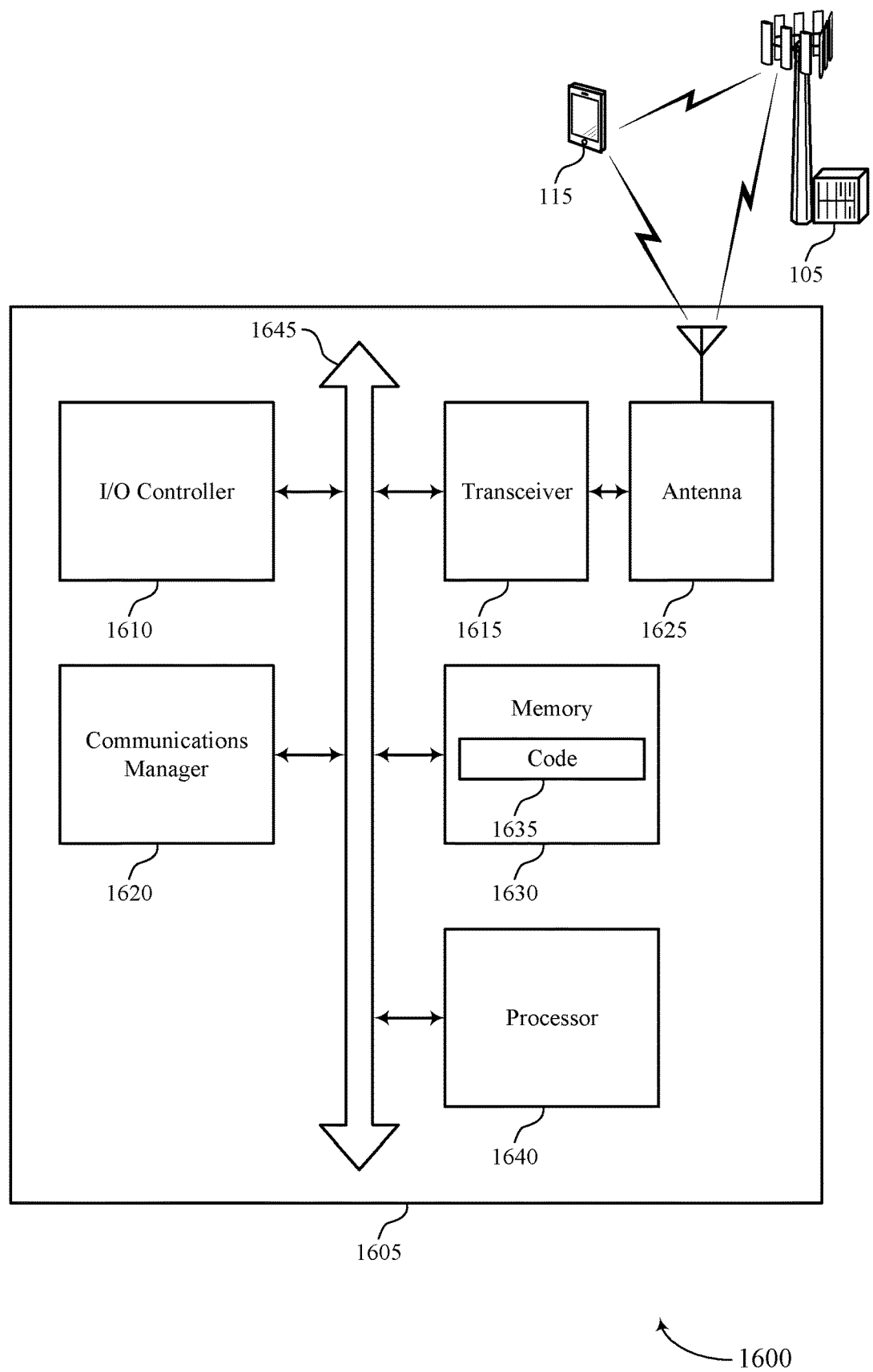
FIG. 16 shows a diagram of a system including a device that supports techniques for assisted message decoding in accordance with various aspects of the present disclosure.

FIG. 16 shows a diagram of a system 1600 including a device 1605 that supports techniques for assisted message decoding in accordance with various aspects of the present disclosure. The device 1605 may be an example of or include the components of a device 1305, a device 1405, or a UE 115 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, an I/O controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally or alternatively, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for assisted message decoding). For example, the device 1605 or a component of the device 1605 may include a processor 1640 and memory 1630 coupled with the processor 1640, the processor 1640 and memory 1630 configured to perform various functions described herein.

The communications manager 1620 may support wireless communication at a second device in accordance with various aspects of the present disclosure. For example, the communications manager 1620 may be configured as or otherwise support a means for transmitting, to a first device, a first random access message including a first random access preamble on a random access channel and a payload on an uplink shared channel. The communications manager 1620 may be configured as or otherwise support a means for receiving, from the first device, a random access response message that includes an indication of the first random access preamble and a timing advance. The communications manager 1620 may be configured as or otherwise support a means for determining whether the timing advance satisfies a threshold. The communications manager 1620 may be configured as or otherwise support a means for establishing a connection with the first device based on whether the timing advance satisfies the threshold.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for assisted message decoding as described herein, or the processor 1640 and the memory 1630 may be otherwise configured to perform or support such operations.

Figure 17:
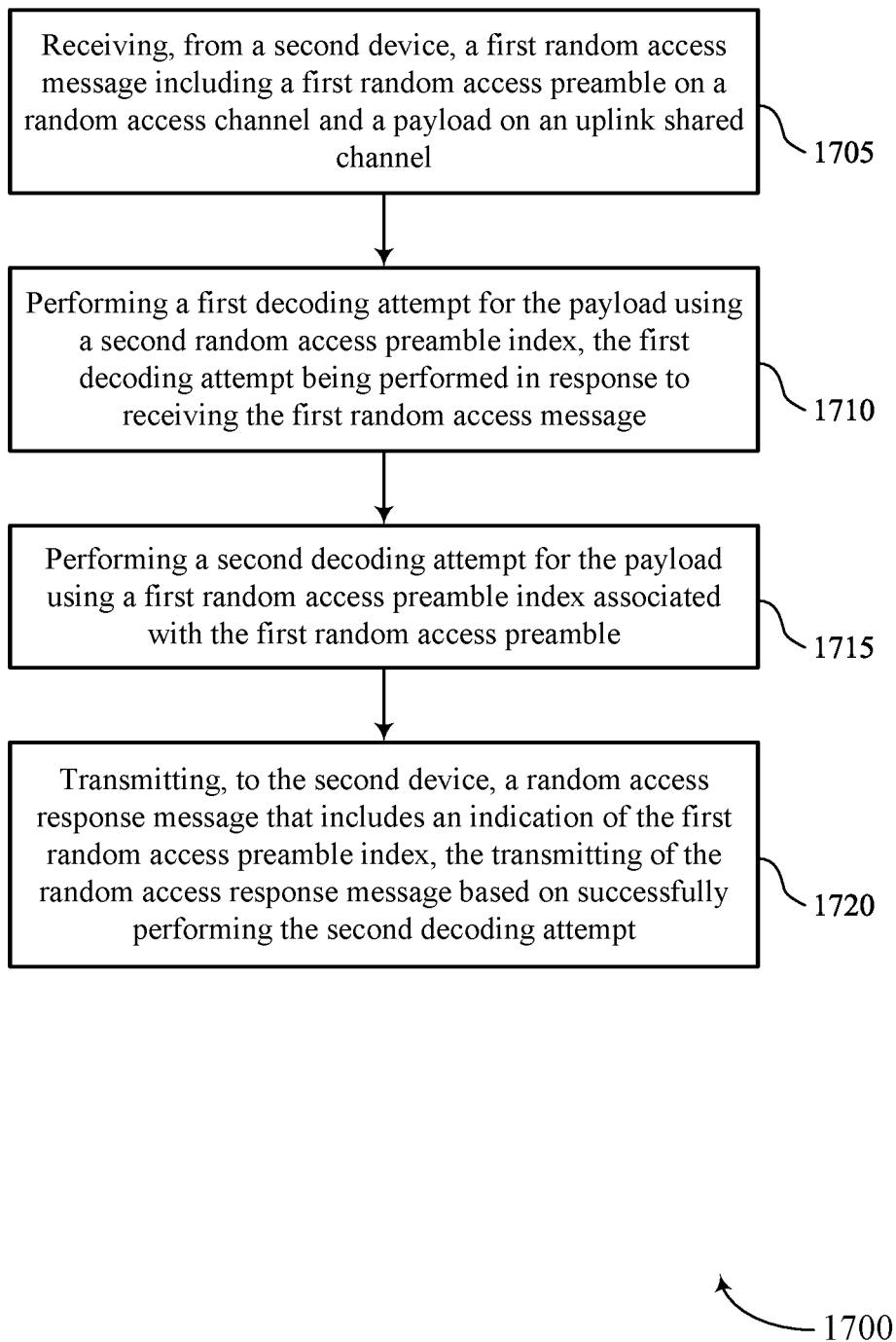
FIGS. 17 through 19 show flowcharts illustrating methods that support techniques for assisted message decoding in accordance with various aspects of the present disclosure.

FIG. 17 shows a flowchart illustrating a method 1700 that supports techniques for assisted message decoding in accordance with various aspects of the present disclosure. The operations of the method 1700 may be implemented by a base station or its components as described herein. For example, the operations of the method 1700 may be performed by a base station 105 as described with reference to FIGS. 1 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a second device, a first random access message including a first random access preamble on a random access channel and a payload on an uplink shared channel. The operations of 1705 may be performed in accordance with various aspects of the present disclosure. In some examples, aspects of the operations of 1705 may be performed by a random access component 1125 as described with reference to FIG. 11.

At 1710, the method may include performing a first decoding attempt for the payload using a second random access preamble index, the first decoding attempt being performed in response to receiving the first random access message. The operations of 1710 may be performed in accordance with various aspects of the present disclosure. In some examples, aspects of the operations of 1710 may be performed by a decoding component 1130 as described with reference to FIG. 11.

At 1715, the method may include performing a second decoding attempt for the payload using a first random access preamble index associated with the first random access preamble. The operations of 1715 may be performed in accordance with various aspects of the present disclosure. In some examples, aspects of the operations of 1715 may be performed by a decoding component 1130 as described with reference to FIG. 11.

At 1720, the method may include transmitting, to the second device, a random access response message that includes an indication of the first random access preamble index, the transmitting of the random access response message based on successfully performing the second decoding attempt. The operations of 1720 may be performed in accordance with various aspects of the present disclosure. In some examples, aspects of the operations of 1720 may be performed by a random access component 1125 as described with reference to FIG. 11.

Figure 18:
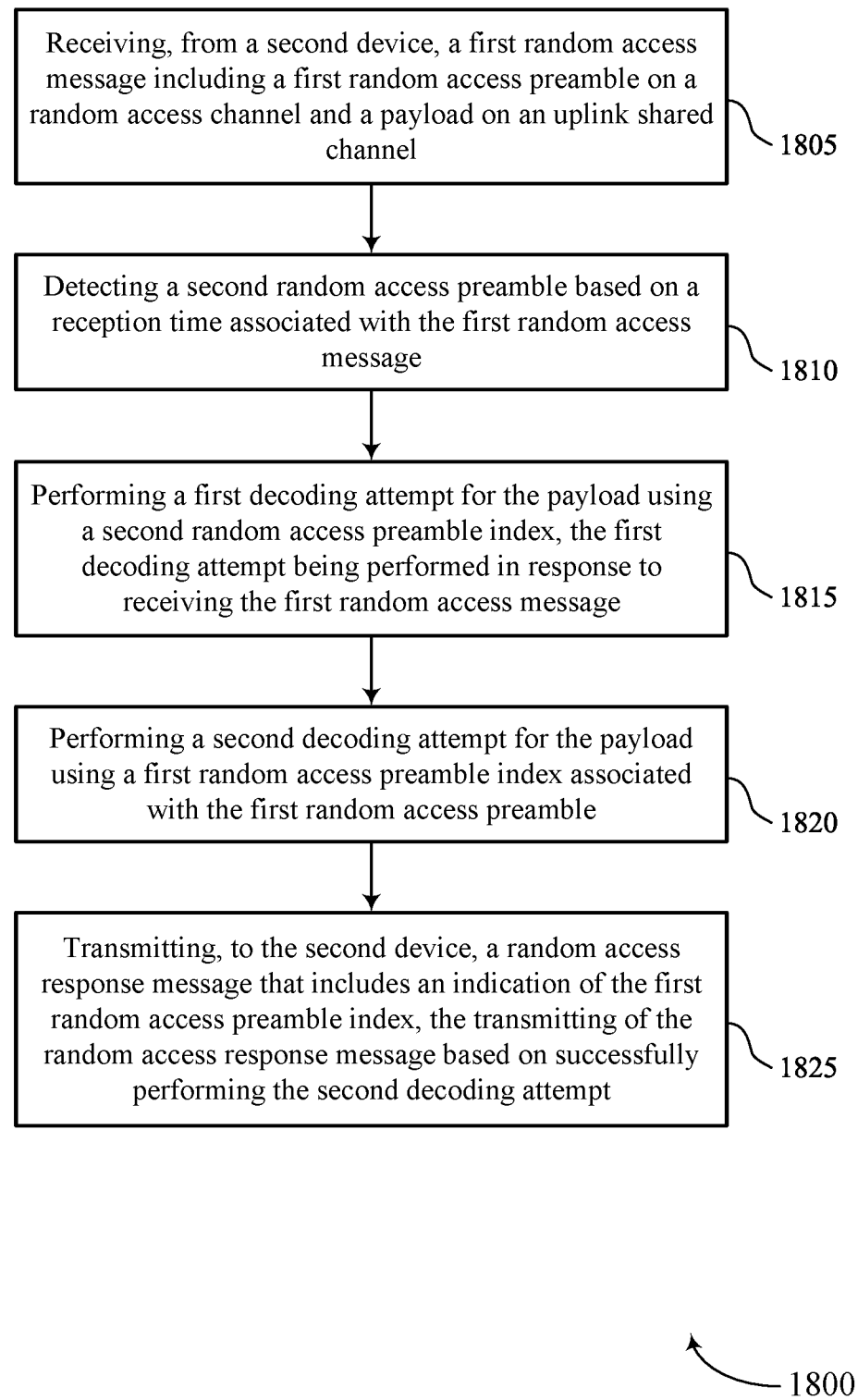

FIG. 18 shows a flowchart illustrating a method 1800 that supports techniques for assisted message decoding in accordance with various aspects of the present disclosure. The operations of the method 1800 may be implemented by a base station or its components as described herein. For example, the operations of the method 1800 may be performed by a base station 105 as described with reference to FIGS. 1 through 12. In some examples, a base station may execute a set of instructions to control the functional elements of the base station to perform the described functions. Additionally or alternatively, the base station may perform aspects of the described functions using special-purpose hardware.

At 1805, the method may include receiving, from a second device, a first random access message including a first random access preamble on a random access channel and a payload on an uplink shared channel. The operations of 1805 may be performed in accordance with various aspects of the present disclosure. In some examples, aspects of the operations of 1805 may be performed by a random access component 1125 as described with reference to FIG. 11.

At 1810, the method may include detecting a second random access preamble based on a reception time associated with the first random access message. The operations of 1810 may be performed in accordance with various aspects of the present disclosure. In some examples, aspects of the operations of 1810 may be performed by a detection component 1135 as described with reference to FIG. 11.

At 1815, the method may include performing a first decoding attempt for the payload using a second random access preamble index, the first decoding attempt being performed in response to receiving the first random access message. The operations of 1815 may be performed in accordance with various aspects of the present disclosure. In some examples, aspects of the operations of 1815 may be performed by a decoding component 1130 as described with reference to FIG. 11.

At 1820, the method may include performing a second decoding attempt for the payload using a first random access preamble index associated with the first random access preamble. The operations of 1820 may be performed in accordance with various aspects of the present disclosure. In some examples, aspects of the operations of 1820 may be performed by a decoding component 1130 as described with reference to FIG. 11.

At 1825, the method may include transmitting, to the second device, a random access response message that includes an indication of the first random access preamble index, the transmitting of the random access response message based on successfully performing the second decoding attempt. The operations of 1825 may be performed in accordance with various aspects of the present disclosure. In some examples, aspects of the operations of 1825 may be performed by a random access component 1125 as described with reference to FIG. 11.

Figure 19:
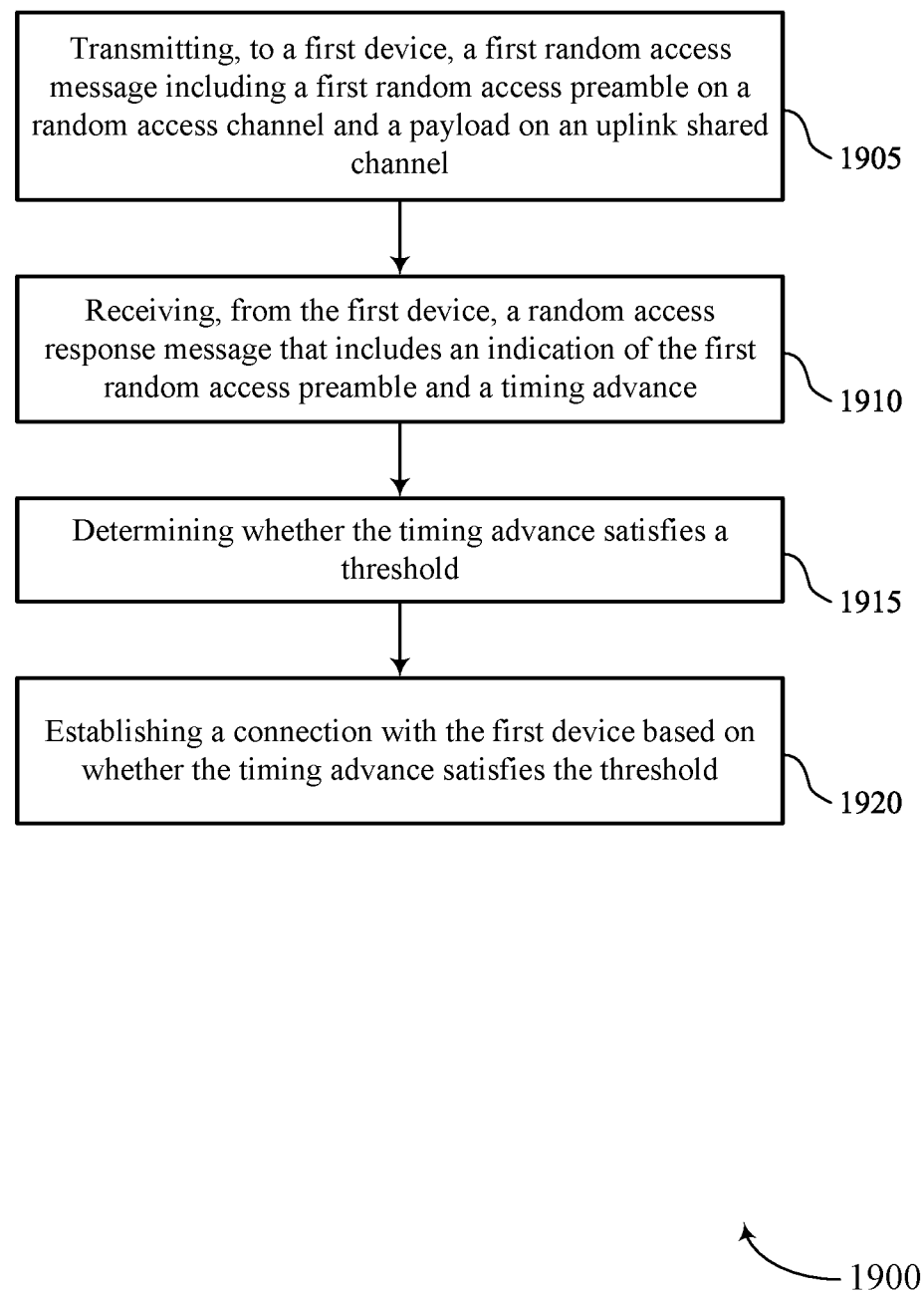

FIG. 19 shows a flowchart illustrating a method 1900 that supports techniques for assisted message decoding in accordance with various aspects of the present disclosure. The operations of the method 1900 may be implemented by a UE or its components as described herein. For example, the operations of the method 1900 may be performed by a UE 115 as described with reference to FIGS. 1 through 7 and 13 through 16. In some examples, a UE may execute a set of instructions to control the functional elements of the UE to perform the described functions. Additionally or alternatively, the UE may perform aspects of the described functions using special-purpose hardware.

At 1905, the method may include transmitting, to a first device, a first random access message including a first random access preamble on a random access channel and a payload on an uplink shared channel. The operations of 1905 may be performed in accordance with various aspects of the present disclosure. In some examples, aspects of the operations of 1905 may be performed by a random access component 1525 as described with reference to FIG. 15.

At 1910, the method may include receiving, from the first device, a random access response message that includes an indication of the first random access preamble and a timing advance. The operations of 1910 may be performed in accordance with various aspects of the present disclosure. In some examples, aspects of the operations of 1910 may be performed by a random access component 1525 as described with reference to FIG. 15.

At 1915, the method may include determining whether the timing advance satisfies a threshold. The operations of 1915 may be performed in accordance with various aspects of the present disclosure. In some examples, aspects of the operations of 1915 may be performed by a timing advance component 1530 as described with reference to FIG. 15.

At 1920, the method may include establishing a connection with the first device based on whether the timing advance satisfies the threshold. The operations of 1920 may be performed in accordance with various aspects of the present disclosure. In some examples, aspects of the operations of 1920 may be performed by a connection establishment component 1535 as described with reference to FIG. 15.

The following provides an overview of aspects of the present disclosure:

Aspect 1: A method for wireless communication at a first device, comprising: receiving, from a second device, a first random access message including a first random access preamble on a random access channel and a payload on an uplink shared channel; performing a first decoding attempt for the payload using a second random access preamble index, the first decoding attempt being performed in response to receiving the first random access message; performing a second decoding attempt for the payload using a first random access preamble index associated with the first random access preamble; and transmitting, to the second device, a random access response message that includes an indication of the first random access preamble index, the transmitting of the random access response message based at least in part on successfully performing the second decoding attempt.

Aspect 2: The method of aspect 1, further comprising: detecting a second random access preamble based at least in part on a reception time associated with the first random access message, wherein performing the first decoding attempt for the payload using the second random access preamble index is based at least in part on detecting the second random access preamble.

Aspect 3: The method of any of aspects 1 or 2, further comprising: receiving, at an L1 entity of the first device from an L2 entity of the first device, a plurality of random access preamble indices including the first random access preamble index and the second random access preamble index, wherein performing the first decoding attempt and the second decoding attempt is based at least in part on receiving the plurality of random access preamble indices.

Aspect 4: The method of aspect 3, wherein the plurality of random access preamble indices include the second random access preamble index and one or more adjacent random access preamble indices from a set of available random access preamble indices that are associated with a same root sequence index as the second random access preamble index.

Aspect 5: The method of aspect 4, wherein the one or more adjacent random access preamble indices that are associated with the same root sequence are identified from the set of available random access preamble indices based at least in part on one or more of a zero correlation zone configuration, a length of a random access sequence, a random access channel format, and a random access channel sub-carrier spacing.

Aspect 6: The method of aspect 3, wherein the plurality of random access preamble indices include the second random access preamble index and one or more adjacent random access preamble indices from a set of available random access preamble indices that are associated with different root sequence indices.

Aspect 7: The method of any of aspects 3 through 6, further comprising: transmitting, from the L1 entity to the L2 entity, an indication of the second random access preamble index based at least in part on detecting a second random access preamble, wherein receiving the plurality of random access preamble indices is based at least in part on transmitting the indication of the second random access preamble index.

Aspect 8: The method of any of aspects 1 or 2, further comprising: selecting, at an L1 entity of the first device without signaling from an L2 entity of the first device, a plurality of random access preamble indices including the first random access preamble index and the second random access preamble index, wherein performing the first decoding attempt and the second decoding attempt is based at least in part on selecting the plurality of random access preamble indices.

Aspect 9: The method of any of aspects 1 through 8, further comprising: transmitting, from an L1 entity of the first device to an L2 entity of the first device, a payload decoding report indicating that the second decoding attempt for the payload using the first random access preamble index is successful; and storing, at the L2 entity of the first device, the first random access preamble based at least in part on the payload decoding report indicating that the second decoding attempt for the payload using the first random access preamble index is successful.

Aspect 10: The method of any of aspects 1 through 9, further comprising: determining a timing advance for the UE based at least in part on the first random access preamble index and the second random access preamble index, wherein the random access response message further includes an indication of the timing advance.

Aspect 11: The method of aspect 10, wherein the timing advance is based at least in part on a time offset between a first reception time associated with the first random access preamble and a second random access preamble associated with the second random access preamble index.

Aspect 12: The method of any of aspects 1 through 11, wherein performing the second decoding attempt further comprises: performing the second decoding attempt subsequent to the first decoding attempt based at least in part on a result of the first decoding attempt being unsuccessful.

Aspect 13: The method of any of aspects 1 through 11, wherein performing the first decoding attempt and the second decoding attempt further comprises: performing the first decoding attempt for the payload using the second random access preamble index and the second decoding attempt for the payload using the first random access preamble index in parallel.

Aspect 14: The method of any of aspects 1 through 13, wherein performing the first decoding attempt for the payload using the second random access preamble index comprises using a second scrambling sequence generation based at least in part on the second random access preamble index; and performing the second decoding attempt for the payload using the first random access preamble index comprises using a first scrambling sequence generation based at least in part on the first random access preamble index.

Aspect 15: The method of any of aspects 1 through 14, wherein the first random access message comprises a msgA of a two-step random access procedure and the random access response message comprises a msgB of the two-step random access procedure.

Aspect 16: A method for wireless communication at a second device, comprising: transmitting, to a first device, a first random access message including a first random access preamble on a random access channel and a payload on an uplink shared channel; receiving, from the first device, a random access response message that includes an indication of the first random access preamble and a timing advance; determining whether the timing advance satisfies a threshold; and establishing a connection with the first device based at least in part on whether the timing advance satisfies the threshold.

Aspect 17: The method of aspect 16, wherein determining whether the timing advance satisfies the threshold comprises determining that the timing advance satisfies the threshold; and establishing the connection with the first device comprises establishing the connection based at least in part on the random access response message.

Aspect 18: The method of aspect 16, wherein determining whether the timing advance satisfies the threshold comprises determining that the timing advance fails to satisfy the threshold; and establishing the connection with the first device comprises establishing the connection based at least in part on different random access signaling.

Aspect 19: The method of any of aspects 16 through 18, wherein the first random access message comprises a msgA of a two-step random access procedure and the random access response message comprises a msgB of the two-step random access procedure.

Aspect 20: An apparatus for wireless communication at a first device, comprising a processor; memory coupled with the processor; and instructions stored in the memory and executable by the processor to cause the apparatus to perform a method of any of aspects 1 through 15.

Aspect 21: An apparatus for wireless communication at a first device, comprising at least one means for performing a method of any of aspects 1 through 15.

Aspect 22: A non-transitory computer-readable medium storing code for wireless communication at a first device, the code comprising instructions executable by a processor to perform a method of any of aspects 1 through 15.

Aspect 23: An apparatus for wireless communication at a second device, comprising a processor; memory coupled with the processor; and instructions stored in the memory and executable by the processor to cause the apparatus to perform a method of any of aspects 16 through 19.

Aspect 24: An apparatus for wireless communication at a second device, comprising at least one means for performing a method of any of aspects 16 through 19.

Aspect 25: A non-transitory computer-readable medium storing code for wireless communication at a second device, the code comprising instructions executable by a processor to perform a method of any of aspects 16 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
    receiving, from a second device, a first random access message including a first random access preamble on a random access channel and a payload on an uplink shared channel;
    detecting a second random access preamble based at least in part on a reception time associated with the first random access message;
    performing a first decoding attempt for the payload using a second random access preamble index, the first decoding attempt being performed in response to receiving the first random access message and detecting the second random access preamble;
    performing a second decoding attempt for the payload using a first random access preamble index associated with the first random access preamble; and
    transmitting, to the second device, a random access response message that includes an indication of the first random access preamble index, the transmitting of the random access response message based at least in part on successfully performing the second decoding attempt.

2. The method of claim 1, further comprising:
    receiving, at a Layer 1 (L1) entity of the first device from a Layer 2 (L2) entity of the first device, a plurality of random access preamble indices including the first random access preamble index and the second random access preamble index, wherein performing the first decoding attempt and the second decoding attempt is based at least in part on receiving the plurality of random access preamble indices.

3. The method of claim 2, wherein the plurality of random access preamble indices include the second random access preamble index and one or more adjacent random access preamble indices from a set of available random access preamble indices that are associated with a same root sequence index as the second random access preamble index.

4. The method of claim 3, wherein the one or more adjacent random access preamble indices that are associated with the same root sequence index are identified from the set of available random access preamble indices based at least in part on one or more of a zero correlation zone configuration, a length of a random access sequence, a random access channel format, and a random access channel subcarrier spacing.

5. The method of claim 2, wherein the plurality of random access preamble indices include the second random access preamble index and one or more adjacent random access preamble indices from a set of available random access preamble indices that are associated with different root sequence indices.

6. The method of claim 2, further comprising:
    transmitting, from the L1 entity to the L2 entity, an indication of the second random access preamble index based at least in part on detecting a second random access preamble, wherein receiving the plurality of random access preamble indices is based at least in part on transmitting the indication of the second random access preamble index.

7. The method of claim 1, further comprising:
selecting, at a Layer 1 (L1) entity of the first device without signaling from a Layer 2 (L2) entity of the first device, a plurality of random access preamble indices including the first random access preamble index and the second random access preamble index, wherein performing the first decoding attempt and the second decoding attempt is based at least in part on selecting the plurality of random access preamble indices.

8. The method of claim 1, further comprising:
transmitting, from a Layer 1 (L1) entity of the first device to a Layer 2 (L2) entity of the first device, a payload decoding report indicating that the second decoding attempt for the payload using the first random access preamble index is successful; and
storing, at the L2 entity of the first device, the first random access preamble based at least in part on the payload decoding report indicating that the second decoding attempt for the payload using the first random access preamble index is successful.

9. The method of claim 1, further comprising:
determining a timing advance for the second device based at least in part on the first random access preamble index and the second random access preamble index, wherein the random access response message further includes an indication of the timing advance.

10. The method of claim 9, wherein the timing advance is based at least in part on a time offset between a first reception time associated with the first random access preamble and a second random access preamble associated with the second random access preamble index.

11. The method of claim 1, wherein performing the second decoding attempt further comprises:
performing the second decoding attempt subsequent to the first decoding attempt based at least in part on a result of the first decoding attempt being unsuccessful.

12. The method of claim 1, wherein performing the first decoding attempt and the second decoding attempt further comprises:
performing the first decoding attempt for the payload using the second random access preamble index and the second decoding attempt for the payload using the first random access preamble index in parallel.

13. The method of claim 1, wherein:
performing the first decoding attempt for the payload using the second random access preamble index comprises using a second scrambling sequence generation based at least in part on the second random access preamble index; and
performing the second decoding attempt for the payload using the first random access preamble index comprises using a first scrambling sequence generation based at least in part on the first random access preamble index.

14. The method of claim 1, wherein the first random access message comprises a message A of a two-step random access procedure and the random access response message comprises a message B of the two-step random access procedure.

15. An apparatus for wireless communication at a first device, comprising:
a processor;
memory coupled with the processor; and
instructions stored in the memory and executable by the processor to cause the apparatus to:
receive, from a second device, a first random access message including a first random access preamble on a random access channel and a payload on an uplink shared channel;
detect a second random access preamble based at least in part on a reception time associated with the first random access message;
perform a first decoding attempt for the payload using a second random access preamble index, the first decoding attempt being performed in response to receiving the first random access message and detecting the second random access preamble;
perform a second decoding attempt for the payload using a first random access preamble index associated with the first random access preamble; and
transmit, to the second device, a random access response message that includes an indication of the first random access preamble index, the transmitting of the random access response message based at least in part on successfully performing the second decoding attempt.

16. The apparatus of claim 15, wherein the instructions are further executable by the processor to cause the apparatus to:
receive, at a Layer 1 (L1) entity of the first device from a Layer 2 (L2) entity of the first device, a plurality of random access preamble indices including the first random access preamble index and the second random access preamble index, wherein performing the first decoding attempt and the second decoding attempt is based at least in part on receiving the plurality of random access preamble indices.

17. The apparatus of claim 16, wherein the plurality of random access preamble indices include the second random access preamble index and one or more adjacent random access preamble indices from a set of available random access preamble indices that are associated with a same root sequence index as the second random access preamble index.

18. The apparatus of claim 17, wherein the one or more adjacent random access preamble indices that are associated with the same root sequence index are identified from the set of available random access preamble indices based at least in part on one or more of a zero correlation zone configuration, a length of a random access sequence, a random access channel format, and a random access channel subcarrier spacing.

19. The apparatus of claim 16, wherein the plurality of random access preamble indices include the second random access preamble index and one or more adjacent random access preamble indices from a set of available random access preamble indices that are associated with different root sequence indices.

20. The apparatus of claim 16, wherein the instructions are further executable by the processor to cause the apparatus to:
transmit, from the L1 entity to the L2 entity, an indication of the second random access preamble index based at least in part on detecting a second random access preamble, wherein receiving the plurality of random access preamble indices is based at least in part on transmitting the indication of the second random access preamble index.

21. The apparatus of claim 15, wherein the instructions are further executable by the processor to cause the apparatus to:

select, at a Layer 1 (L1) entity of the first device without signaling from a Layer 2 (L2) entity of the first device, a plurality of random access preamble indices including the first random access preamble index and the second random access preamble index, wherein performing the first decoding attempt and the second decoding attempt is based at least in part on selecting the plurality of random access preamble indices.

22. The apparatus of claim 15, wherein the instructions are further executable by the processor to cause the apparatus to:

transmit, from a Layer 1 (L1) entity of the first device to a Layer 2 (L2) entity of the first device, a payload decoding report indicating that the second decoding attempt for the payload using the first random access preamble index is successful; and store, at the L2 entity of the first device, the first random access preamble based at least in part on the payload decoding report indicating that the second decoding attempt for the payload using the first random access preamble index is successful.

23. The apparatus of claim 15, wherein the instructions are further executable by the processor to cause the apparatus to:

determine a timing advance for the second device based at least in part on the first random access preamble index and the second random access preamble index, wherein the random access response message further includes an indication of the timing advance.

24. A non-transitory computer-readable medium storing code for wireless communication at a first device, the code comprising instructions executable by one or more processors to:

receive, from a second device, a first random access message including a first random access preamble on a random access channel and a payload on an uplink shared channel;

detect a second random access preamble based at least in part on a reception time associated with the first random access message;

perform a first decoding attempt for the payload using a second random access preamble index, the first decoding attempt being performed in response to receiving the first random access message and detecting the second random access preamble;

perform a second decoding attempt for the payload using a first random access preamble index associated with the first random access preamble; and transmit, to the second device, a random access response message that includes an indication of the first random access preamble index, the transmitting of the random access response message based at least in part on successfully performing the second decoding attempt.

25. The non-transitory computer-readable medium of claim 24, wherein the instructions are further executable by the one or more processors to:

receive, at a Layer 1 (L1) entity of the first device from a Layer 2 (L2) entity of the first device, a plurality of random access preamble indices including the first random access preamble index and the second random access preamble index, wherein performing the first decoding attempt and the second decoding attempt is based at least in part on receiving the plurality of random access preamble indices.

26. A first device for wireless communication, comprising:

means for receiving, from a second device, a first random access message including a first random access preamble on a random access channel and a payload on an uplink shared channel;

means for detecting a second random access preamble based at least in part on a reception time associated with the first random access message;

means for performing a first decoding attempt for the payload using a second random access preamble index, the first decoding attempt being performed in response to receiving the first random access message and detecting the second random access preamble;

means for performing a second decoding attempt for the payload using a first random access preamble index associated with the first random access preamble; and means for transmitting, to the second device, a random access response message that includes an indication of the first random access preamble index, the transmitting of the random access response message based at least in part on successfully performing the second decoding attempt.

\* \* \* \* \*